United States Patent
Arima et al.

(10) Patent No.: US 6,862,485 B2
(45) Date of Patent: Mar. 1, 2005

(54) REMOTE MAINTENANCE METHOD, INDUSTRIAL DEVICE, AND SEMICONDUCTOR DEVICE

(75) Inventors: Juntaro Arima, Hitachinaka (JP); Masaaki Inaba, Yokohama (JP); Takeiki Aizono, Kawasaki (JP); Takashi Iizumi, Hitachinaka (JP)

(73) Assignee: Hitachi, Ltd. (JP)

( * ) Notice: Subject to any disclaimer, the term of this patent is extended or adjusted under 35 U.S.C. 154(b) by 127 days.

(21) Appl. No.: 10/196,207

(22) Filed: Jul. 17, 2002

(65) Prior Publication Data

US 2002/0183875 A1 Dec. 5, 2002

Related U.S. Application Data

(62) Division of application No. 10/080,394, filed on Feb. 25, 2002, now Pat. No. 6,708,072.

(30) Foreign Application Priority Data

May 31, 2001 (JP) ........................................ 2001-163663

(51) Int. Cl.[7] .......................... G06F 19/00; G06F 15/00; G06F 11/00; G06F 11/30; G21C 17/00
(52) U.S. Cl. .......................... 700/95; 702/184; 702/188
(58) Field of Search .......................... 700/95, 97, 108, 700/109, 121; 702/184, 188

(56) References Cited

U.S. PATENT DOCUMENTS

| | | | |
|---|---|---|---|
| 5,303,005 A | | 4/1994 | Takano et al. |
| 5,617,342 A | | 4/1997 | Elazouni |
| 6,170,742 B1 | | 1/2001 | Yacoob |
| 6,374,298 B2 | * | 4/2002 | Tanno .................. 709/227 |
| 6,618,692 B2 | * | 9/2003 | Takahashi et al. .......... 702/188 |
| 6,721,685 B2 | * | 4/2004 | Kodama ...................... 702/184 |
| 2002/0052715 A1 | * | 5/2002 | Maki .......................... 702/184 |
| 2003/0066974 A1 | * | 4/2003 | Muraki ..................... 250/492.2 |

FOREIGN PATENT DOCUMENTS

| | | |
|---|---|---|
| EP | 0 467 257 A2 | 7/1991 |
| EP | 0554 826 A2 | 8/1993 |
| EP | 0 822 473 A2 | 2/1998 |
| JP | 11-15520 | 1/1999 |
| WO | WO 00/23894 A | 4/2000 |

* cited by examiner

*Primary Examiner*—Albert W. Paladini
*Assistant Examiner*—Ryan Jarrett
(74) *Attorney, Agent, or Firm*—Dickstein Shapiro Morin & Oshinsky LLP

(57) ABSTRACT

The present invention provides a remote maintenance method, a remote maintenance system, and an industrial device for enabling control and thorough services and billing according to the contents of the remote maintenance operation and the request destination of maintenance and enabling access limit according to the attribute of a service person, access limit according to the device state, and output limit according to the output mode. The industrial device 123 installed at the factory 120 and the operation device 113 installed in the maintenance center 110 are connected via the network 100. The operation device 113 transmits command information indicating a command concerning maintenance to the industrial device 123 and the industrial device 123 executes a process according to the received command information, generates charge information indicating a charge concerning maintenance according to the contents of the executed process, and outputs the whole or a part of the generated charge information to the output device of the industrial device 123.

8 Claims, 23 Drawing Sheets

FIG. 3

SERVICE PERSON ATTRIBUTE MANAGEMENT TABLE ~140

| SERVICE PERSON ID | PASSWORD | TECHNICAL LEVEL |
|---|---|---|
| D1 | 1234 | HIGHER LEVEL |
| D2 | 5678 | MIDIUM LEVEL |
| ... | ... | ... |

FIG. 4

DEVICE STATE MANAGEMENT TABLE ~141

| TRANSITION DETE AND TIME | DEVICE STATE |
|---|---|
| 2001:01:02:10:10:10 | PRODUCTION |
| 2001:01:02:10:15:10 | STANDBY |
| ... | ... |

FIG. 5

PROGRAM MANAGEMENT TABLE ~142

| PRO-GRAM ID | PROGRAM KIND | NAME | PROCESS CONDITION | PROCESS PROCEDURE |
|---|---|---|---|---|
| P1 | USE HISTORY READ | PROGRAM READ | – | (1) PROGRAM READ |
| P2 | USE HISTORY READ | PROGRAM EXECUTION HISTORY READ | – | (1) PROGRAM EXECUTION HISTORY READ |
| P3 | USE HISTORY READ | SENSOR STATE HISTORY READ | – | (1) SENSOR STATE HISTORY READ |
| P4 | USE HISTORY READ | PROCESS RESULT READ | – | (1) PROCESS RESULT READ |
| P5 | PROGRAM OPERATION | PROGRAM CREATE | – | (1) PROGRAM CREATE |
| P6 | PROGRAM OPERATION | PROGRAM EDIT | – | (1) PROGRAM EDIT |
| P7 | PROGRAM OPERATION | PROGRAM EDIT | – | (1) PROGRAM EDIT |
| P8 | WAFER PROCESS | AUTOMATIC WAFER PROCESS | OPERATION MODE: AUTOMATIC SLOT No.:1 PROCESSING UNIT: WAFER MEASURING IMAGE: IMAGE 1 | (1) WAFER LOAD (2) WAFER ALIGNMENT (3) ADDRESSING (4) MEASUREMENT (5) WAFER UNLOAD |
| P9 | WAFER PROCESS | MANUAL WAFER PROCESS | OPERATION MODE: MANUAL SLOT No.:2 PROCESSING UNIT: CASSETTE MEASURING IMAGE: IMAGE 2 | (1) WAFER LOAD (2) WAFER ALIGNMENT (3) ADDRESSING (4) MEASUREMENT (5) WAFER UNLOAD |
| ... | ... | ... | ... | ... |

FIG. 6

EXECUTION AUTHORITY MANAGEMENT TABLE 143

| PROGRAM ID | EXECUTION AUTHORITY |
|---|---|
| P1 | x  x  −  − |
| P2 | −  x  −  − |
| P3 | −  x  −  − |
| P4 | x  x  −  − |
| P5 | −  x  −  − |
| P6 | −  x  −  − |
| P7 | −  x  −  − |
| P8 | −  −  −  − |
| P9 | −  −  −  − |
| ... | ... |

FIG. 7

PROGRAM EXECUTION HISTORY MANAGEMENT TABLE 144

| EXECUTION DATE AND TIME | ENGINEER ID | PROGRAM ID | PARAMETER |
|---|---|---|---|
| 2001:01:02:10:10:10 | U1 | P8 | − |
| 2001:01:02:10:15:10 | U1 | P9 | − |
| ... | ... | ... | ... |

FIG. 8
SENSOR STATE HISTORY MANAGEMENT TABLE 145
| RECORDING DATE AND TIME | SENSOR S1 | SENSOR S2 | ... |
|---|---|---|---|
| 2001:01:02:10:10:10 | 0.01 | 0.10 | ... |
| 2001:01:02:10:10:11 | 0.02 | 0.20 | ... |
| ... | ... | ... | ... |
FIG. 9
PROCESS RESULT MANAGEMENT TABLE 146
| WAFER ID | WAFER IMAGE |
|---|---|
| W1 | 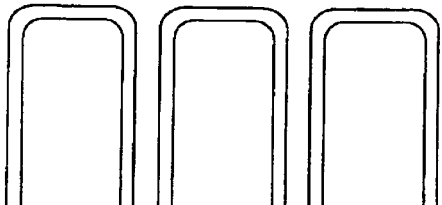 |
| W2 | 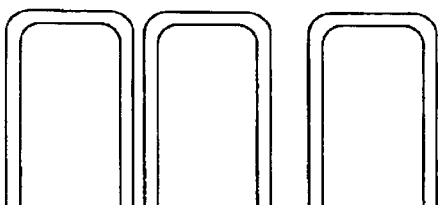 |
| ... | ... |
FIG. 10
OUTPUT AUTHORITY MANAGEMENT TABLE 147
| ITEM | OUTPUT AUTHORITY | |
|---|---|---|
| EXECUTION DATE AND TIME | × | × |
| PROGRAM KIND | × | × |
| PROGRAM ID | × | − |
| PARAMETER | × | − |

FIG. 11

MAINTENANCE RESULT MANAGEMENT TABLE 148

| OPERATION ID | RECORDING DATE AND TIME | TECHNICAL LEVEL | SERVICE PERSON ID | OPERATION STATE | PROGRAM ID | PARA-METER | DEVICE STATE | OUTPUT MODE |
|---|---|---|---|---|---|---|---|---|
| ⋮ | ⋮ | ⋮ | ⋮ | ⋮ | ⋮ | ⋮ | ⋮ | ⋮ |
| 101 | 2001:01:03 :11:10:10 | HIGHER LEVEL | D1 | START | — | — | PRO-DUCTION | PARTIAL DISPLAY |
| 101 | 2001:01:03 :11:12:10 | HIGHER LEVEL | D1 | INCOMP-LETION | P2 | — | PRO-DUCTION | PARTIAL DISPLAY |
| 101 | 2001:01:03 :11:20:10 | HIGHER LEVEL | D1 | INCOMP-LETION | P3 | — | PRO-DUCTION | PARTIAL DISPLAY |
| 101 | 2001:01:03 :11:25:10 | HIGHER LEVEL | D1 | INCOMP-LETION | P4 | — | STANDBY | PARTIAL DISPLAY |
| 101 | 2001:01:03 :11:30:10 | HIGHER LEVEL | D1 | INCOMP-LETION | P1 | P8 | STANDBY | PARTIAL DISPLAY |
| 101 | 2001:01:03 :11:35:10 | HIGHER LEVEL | D1 | INCOMP-LETION | P6 | P8 | STANDBY | PARTIAL DISPLAY |
| 101 | 2001:01:03 :11:40:10 | HIGHER LEVEL | D1 | INCOMP-LETION | P8 | — | STANDBY | PARTIAL DISPLAY |
| 101 | 2001:01:03 :11:45:10 | HIGHER LEVEL | D1 | INCOMP-LETION | P4 | — | STANDBY | PARTIAL DISPLAY |
| 101 | 2001:01:03 :11:50:10 | HIGHER LEVEL | D1 | START | — | — | STANDBY | PARTIAL DISPLAY |
| ⋮ | ⋮ | ⋮ | ⋮ | ⋮ | ⋮ | ⋮ | ⋮ | ⋮ |

FIG. 12

MAINTENANCE CHARGE MANAGEMENT TABLE 149

MARKED CHARGE MANAGEMENT TABLE 150

| TECHNICAL LEVEL | MARKED CHARGE |
|---|---|
| HIGHER LEVEL | ¥30,000 |
| MEDIUM LEVEL | ¥10,000 |

(PER EACH PROGRAM EXECUTION)

EXTRA CHARGE MANAGEMENT TABLE 152

| OUTPUT MODE | EXTRA CHARGE |
|---|---|
| ALL DISPLAY | ¥5,000 |
| PARTIAL DISPLAY | ¥1,000 |

(PER EACH PROGRAM EXECUTION)

DISCOUNT CHARGE MANAGEMENT TABLE 151

| PROGRAM ID | NAME | DEVICE STATE | DISCOUNT CHARGE |
|---|---|---|---|
| P1 | PROGRAM READ | PRODUCTION | ¥5,000 |
| | | OTHERS | ¥7,000 |
| P1 | PROGRAM READ | PRODUCTION | ¥2,000 |
| | | OTHERS | ¥3,000 |
| P1 | PROGRAM READ | PRODUCTION | ¥2,000 |
| | | OTHERS | ¥3,000 |
| P1 | PROGRAM READ | PRODUCTION | ¥5,000 |
| | | OTHERS | ¥7,000 |
| P1 | PROGRAM READ | PRODUCTION | ¥5,000 |
| | | OTHERS | ¥7,000 |
| OTHERS | | | ¥0 |

(PER EACH PROGRAM EXECUTION)

FIG. 20

EXECUTION STATE OUTPUT SCREEN    300

EXECUTION STATE:

| EXECUTION DATE AND TIME | PROGRAM KIND | PROGRAM ID | PARA-METER |
|---|---|---|---|
| 2001:01:03:11:15:10 | USE HISTORY READ | — | — |
| 2001:01:03:11:20:10 | USE HISTORY READ | — | — |
| 2001:01:03:11:25:10 | USE HISTORY READ | — | — |
| 2001:01:03:11:30:10 | USE HISTORY READ | — | — |
| 2001:01:03:18:36:10 | PROGRAM OPERATION | — | — |
| 2001:01:03:18:40:10 | WAFER PROCESS | — | — |
| 2001:01:03:18:45:10 | USE HISTORY READ | — | — |

FIG. 24

MAINTENANCE CHARGE LIST SETTING SCREEN  340

MAINTENANCE CHARGE LIST: 341

MARKED CHARGE 342

| MAINTE-NANCE CENTER ID | MARKED CHARGE |
|---|---|
| C1 | ¥30,000 |
| C2 | ¥10,000 |

EXTRA CHARGE

| OUTPUT MODE | EXTRA CHARGE |
|---|---|
| ALL | ¥5,000 |
| TYPE | ¥1,000 |

344

DISCOUNT CHARGE 343

| PROGRAM ID | NAME | DEVICE STATE | DISCOUNT CHARGE |
|---|---|---|---|
| P1 | PROGRAM READ | PRODUCTION | ¥5,000 |
| | | OTHERS | ¥7,000 |
| P2 | PROGRAM EXECUTION HISTORY READ | PRODUCTION | ¥5,000 |
| | | OTHERS | ¥7,000 |
| P3 | SENSOR STATE HISTORY READ | PRODUCTION | ¥5,000 |
| | | OTHERS | ¥7,000 |

ACTION: 345　　TRANSMISSION DESTINATION

346

CHARGE LIST OPERATION TRANSMISSION 349　　348　　350

| No. | SEMICONDUCTOR FACTORY |
|---|---|
| 1 | FACTORY F1 |
| 2 | FACTORY F2 |
| 3 | FACTORY F3 |

| TRANSMISSION DESTINATION | FACTORY F1 |
|---|---|

351

353　　352　　354

| No. | SEMICONDUCTOR FACTORY |
|---|---|
| 1 | DEVICE E1 |
| 2 | DEVICE E2 |
| 3 | DEVICE E3 |

| TRANSMISSION DESTINATION | DEVICE E1 |
|---|---|

STATE OUTPUT AUTHORITY SETTING SCREEN 380

STATE OUTPUT AUTHORITY: 381

STATE OUTPUT AUTHORITY 382

| ITEM | OUTPUT AUTHORITY |
|---|---|
| EXECUTION DATE AND TIME | × × |
| PROGRAM KIND | × × |
| PROGRAM ID | × — |
| PARAMETER | × — |

ACTION: 383  TRANSMISSION DESTINATION: 385

384
CHARGE LIST OPERATION TRANSMISSION

| No. | SEMICONDUCTOR FACTORY |
|---|---|
| 1 | FACTORY F1 |
| 2 | FACTORY F2 |
| 3 | FACTORY F3 |

| TRANSMISSION DESTINATION | FACTORY F1 |
|---|---|

| No. | SEMICONDUCTOR FACTORY |
|---|---|
| 1 | DEVICE E1 |
| 2 | DEVICE E2 |
| 3 | DEVICE E3 |

| TRANSMISSION DESTINATION | DEVICE E1 |
|---|---|

REMOTE MAINTENANCE METHOD, INDUSTRIAL DEVICE, AND SEMICONDUCTOR DEVICE

CROSS REFERENCE TO RELATED APPLICATIONS

The present application is a divisional application of U.S. patent application Ser. No. 10/080,394 filed on Feb. 25, 2002 now U.S. Pat. No. 6,708,072, the disclosure of which is herewith incorporated by reference in its entirety.

BACKGROUND OF THE INVENTION

1. Field of the Invention

The present invention relates to a billing method and device of a remote maintenance system for an industrial device and more particularly to a remote maintenance method and a remote maintenance system and device for enabling control and thorough services and billing according to the contents of maintenance.

2. Prior Art

Conventionally, it is proposed to connect an industrial device of a manufacturer to a maintenance center of a device supply vendor via a public telephone line or Internet and remote-maintain the industrial device from the maintenance center. Japanese Application Patent Laid-open Publication No. Hei 11-15520 proposes a remote maintenance system using a network and by use of this system, regardless of the installation region of an industrial device, the industrial device can be maintained.

In recent years, particularly in the semiconductor industry, the number of installed industrial devices is rapidly increased due to a sudden increase in capital investment. In such a state, the maintenance cost of industrial devices is likely to increase and it is a problem how to suppress the maintenance cost. However, the previous general billing method for maintenance is a method for billing a manufacturer for a fixed charge on the basis of the cost of an industrial device and the labor costs of service persons and even when no device is maintained actually, there is a case that the manufacturer must pay the fixed charge. Further, in the remote maintenance system disclosed in Japanese Application Patent Laid-open Publication No. Hei 11-15520, no billing method is described.

SUMMARY OF THE INVENTION

The present invention was developed with the foregoing problem in view and is intended to provide a remote maintenance method, a remote maintenance system, and an industrial device for enabling control and thorough services and billing according to the contents of the remote maintenance operation and the request destination of maintenance and enabling access limit according to the attribute of a service person, access limit according to the device state, and output limit according to the output mode.

An embodiment of the present invention is a remote maintenance system that an industrial device for executing a specific process and an operation device for maintaining the industrial device are connected to each other via a network, which provides a remote maintenance method characterized in that the operation device transmits command information indicating a maintenance command to the industrial device and the industrial device executes the process according to the received command information, generates charge information indicating the value for maintenance according to the contents of the executed process, and outputs the whole or a part of the generated charge information. By use of this method, control and thorough services and billing according to the contents of the maintenance operation performed by the industrial device can be executed. Semiconductor devices characterized in that the devices are manufactured using an industrial device managed by this billing method are also included in the category of the present invention.

Another embodiment of the present invention is a remote maintenance system that one or more industrial devices for executing a specific process and one or more operation devices for maintaining the industrial devices are connected to each other via a network, which provides a remote maintenance method characterized in that each industrial device monitors an occurrence of a trouble in each industrial device, when each industrial device detects an occurrence of a trouble, generates status information for identifying the condition of the trouble, decides the operation device to be notified of the generated status information, and notifies the generated status information to the decided operation device, and the operation device decides the troubleshooting method for the trouble of the industrial device on the basis of the notified status information and transmits command information indicating a maintenance command on the basis of the troubleshooting method to the industrial device, and the industrial device executes the process according to the received command information, generates charge information indicating the value for maintenance according to the identifier of the operation device to which the status information is notified, and outputs the whole or a part of the generated charge information. By use of this method, control and thorough services and billing according to the request destination of maintenance can be executed.

BRIEF DESCRIPTION OF THE DRAWINGS

FIG. 3 is a drawing showing the structure of a service person attribute management table managed by the semiconductor manufacturing device shown in FIG. 1.

FIG. 4 is a drawing showing the structure of a device state management table managed by the semiconductor manufacturing device shown in FIG. 1.

FIG. 5 is a drawing showing the structure of a program management table stored in the semiconductor manufacturing device shown in FIG. 1.

FIG. 6 is a drawing showing the structure of an execution authority management table stored in the semiconductor manufacturing device shown in FIG. 1.

FIG. 7 is a drawing showing the structure of a program execution history management table stored in the semiconductor manufacturing device shown in FIG. 1.

FIG. 8 is a drawing showing the structure of a sensor state history management table stored in the semiconductor manufacturing device shown in FIG. 1.

FIG. 9 is a drawing showing the structure of a process result management table stored in the semiconductor manufacturing device shown in FIG. 1.

FIG. 10 is a drawing showing the structure of an output control management table stored in the semiconductor manufacturing device shown in FIG. 1.

FIG. 11 is a drawing showing the structure of a maintenance result management table stored in the semiconductor manufacturing device shown in FIG. 1.

FIG. 12 is a drawing showing the structure of a maintenance charge management table stored in the semiconductor manufacturing device shown in FIG. 1.

FIG. 20 is a drawing showing the execution state output screen to be displayed on the semiconductor manufacturing device shown in FIG. 1.

FIG. 24 is a drawing showing the maintenance charge list setting screen to be displayed on the operation device shown in FIG. 1.

FIG. 27 is a drawing showing the output control setting screen to be displayed on the operation device shown in FIG. 1.

DESCRIPTION OF THE INVENTION

The first embodiment of the present invention will be explained hereunder in detail. This embodiment is a remote maintenance system for a semiconductor manufacturing device to which the present invention is applied. This system enables thorough billing according to the contents of maintenance. There are no restrictions on industrial devices which can be handled by the present invention except a built-in computer. However, in the explanation of this embodiment, various devices and systems to be used for manufacture of semiconductors such as an exposure device, a coating developing device, a heat treating device, an assembly device, and an inspection device which are used at a semiconductor manufacturing plant as industrial devices are assumed. Here, these devices and systems are generally named a semiconductor manufacturing device.

Figure 1:
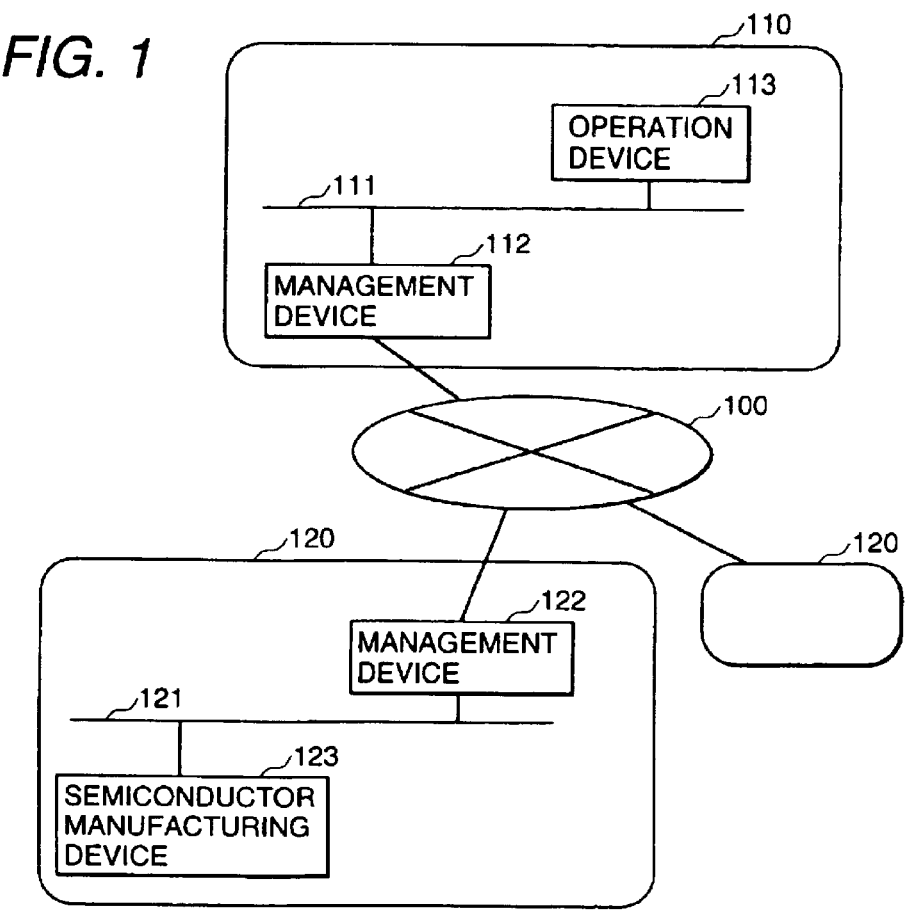
FIG. 1 is a block diagram showing the constitution of the system of the first embodiment of the present invention.

FIG. 1 is a block diagram showing an example of the constitution of a remote maintenance system of a semiconductor manufacturing device to which the present invention is applied. Numeral 110 indicates a maintenance center of a company for supplying a semiconductor manufacturing device (hereinafter recorded as a device supply vendor). Numeral 120 indicates a factory of a company for manufacturing semiconductor devices using the semiconductor manufacturing device (hereinafter recorded as a semiconductor manufacturer). In the system shown in FIG. 1, two factories 120 are indicated. However, there may be three or more factories 120 actually. Further, the factories 120 may belong to different semiconductor manufacturers or the same semiconductor manufacturer.

In the maintenance center 110, one or more operation devices 113 for maintaining the semiconductor manufacturing device and a management device 112 for managing communication to the maintenance center 110 are installed. Each operation device 113 and the management device 112 are connected to each other via an intra-net 111. At each factory 120, one or more semiconductor manufacturing devices 123 for manufacturing semiconductor devices and a management device 122 for managing communication to the factories 120 are installed. Each semiconductor manufacturing device 123 and the management device 122 are connected to each other via an intra-net 121. The management device 112 installed in the maintenance center 110 is connected to the management device 122 installed at each factory 120 via an Internet 100. Each device shown in FIG. 1 is a device using a single computer. Actually however, a single device may use a plurality of computers or a plurality of devices may use a single computer.

Each operation device 113 installed in the maintenance center 110 is a device to be used to maintain each semiconductor manufacturing device 123 by remote control by a service person of the maintenance center 110. Each operation device 113 has a function for, when it receives a message indicating a maintenance request (hereinafter recorded as a maintenance request) from the management device 112, displaying the information included in the maintenance request, for example, on a display unit. The information included in the maintenance request includes data for identifying the condition of a trouble (hereinafter recorded as a status) and data for identifying the state for outputting the state of the maintenance operation to each semiconductor device (hereinafter recorded as an output mode). The maintenance request includes, for example, the trouble detection date and time, semiconductor factory identifier, semiconductor manufacturing device identifier, and semiconductor manufacturing device kind.

The service person reads the displayed information and then judges whether troubleshooting is necessary online or not. When the service person judges necessity of online troubleshooting, he inputs his identifier and password using the keyboard so as to notify the effect of start of the maintenance operation and presses the start notification transmission button using the mouse. Each operation device 113 has a function for transmitting a message composed of the identifier and password of the service person input by the service person and the output mode taken out from the maintenance request (hereinafter recorded as a start notification) to each semiconductor manufacturing device 123 online via the management device 112 and the management device 122. Upon receipt of the start notification, each semiconductor manufacturing device 123 confirms the service person. By this confirmation, the service person is discriminated by a unique identifier such as D1, D2, - - - .

The confirmed service person, so as to transmit a command to the semiconductor manufacturing device 123, inputs the command composed of the identifier of the program to be executed by the semiconductor manufacturing device 123 and the parameter to be given to the program and the identifier of the file for storing execution results of the program using the keyboard and presses the maintenance operation transmission button using the mouse. The service person may input a plurality of commands and file identifiers. The operation device 113 has a function for transmitting a message composed of one or more commands input by the service person (hereinafter recorded as a maintenance operation) online to the semiconductor manufacturing device 123 via the management device 112 and the management device 122.

Upon receipt of the maintenance operation from the operation device 113, the semiconductor manufacturing device 123 takes out all the commands from the maintenance operation, executes the program designated by each command using the parameter corresponding to each program, generates a command response composed of execution results of the program for each command after execution of the programs designated by all the commands, and transmits messages composed of these command responses (hereinafter recorded as maintenance operation responses) to the operation device 113 in a batch.

The operation device 113 has a function for, when the device 113 receives the maintenance operation response from the semiconductor manufacturing device 123, taking out all the command responses stored in the maintenance operation response, storing the execution results of the program stored in each command response in the file corresponding to each command, and displaying the effect of reception of the maintenance operation response on the display unit.

The service person reading the displayed information, so as to confirm the program execution results, presses the identifier of the file in which the program execution results are stored using the mouse. The operation device 113 has a function for displaying the contents of the pressed file on the display unit. The service person reading the displayed contents judges necessity of further troubleshooting, presses the continuation button using the mouse when it is necessary, inputs a new command and file identifier using the keyboard, and presses the maintenance operation transmission button using the mouse. The service person repeats transmission of the maintenance operation until ending of the troubleshooting.

When the troubleshooting ends, the service person presses the completion notification transmission button using the mouse. The operation device 113 has a function for transmitting a message indicating the effect of completion of the maintenance operation (hereinafter recorded as a completion notification) online to the semiconductor manufacturing device 123 via the management device 112 and the management device 122. Upon receipt of the completion notification, the semiconductor manufacturing device 123 calculates the charge for the concerned maintenance according to the process contents of the program executed between reception of the start notification and reception of the completion notification and displays the calculated maintenance charge, for example, on the display unit. The calculation of the maintenance charge may be executed by the management device 122 or a calculation device (not shown in the drawing) installed externally instead of the semiconductor manufacturing device 123. In this embodiment, the operation from transmission of the start notification to transmission of the completion notification is one maintenance operation.

The management device 112 installed in the maintenance center 110 is a device for managing communication to the maintenance center 110. The management device 112 has a function for periodically monitoring whether a maintenance request is received from the management device 122 installed at each factor 120 or not and when a maintenance request is received, transmitting the maintenance request to the operation device 113 used by a specific service person according to a predetermined rule. Further, the management device 112 has a function for transmitting each message of the start notification, maintenance operation, and completion notification transmitted from the operation device 113 in response to the maintenance request to the management device 122 of the factory 120 transmitting the maintenance request.

The management device 122 installed at the factory 120 is a device for managing communication to the factory 120. The management device 122 has a function for periodically monitoring whether a maintenance request is received from each semiconductor manufacturing device 123 or not and when a maintenance request is received, transmitting the maintenance request to the management device 112 of the maintenance center 110. Further, the management device 122 has a function for transmitting each message of the start notification, maintenance operation, and completion notification transmitted from the management device 112 of the maintenance center 110 in response to the maintenance request to the semiconductor manufacturing device 123 transmitting the maintenance request.

Figure 2:
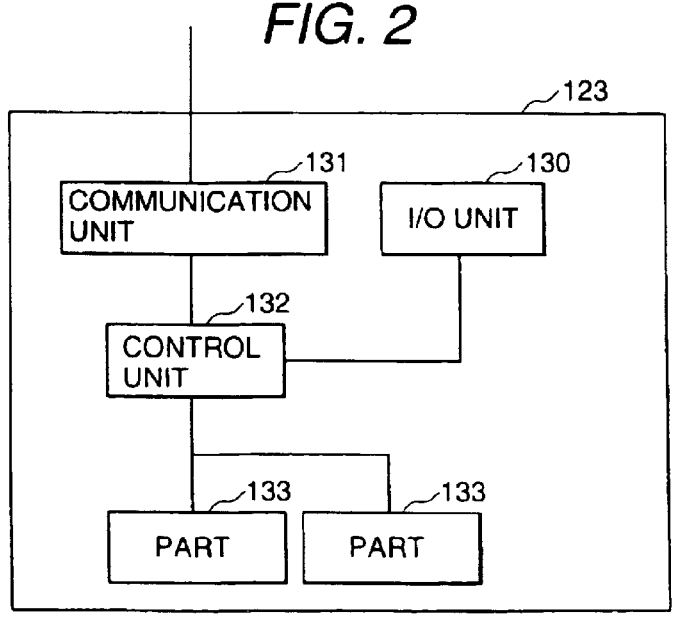
FIG. 2 is a block diagram showing the constitution of the semiconductor manufacturing device shown in FIG. 1.

The semiconductor manufacturing device 123 installed at each factory 120 is a device for manufacturing semiconductor devices by an engineer at the factory 120. FIG. 2 is a block diagram showing the constitution of the semiconductor manufacturing device 123. The semiconductor manufacturing device 123 is composed of an I/O unit 130 for inputting data necessary to manufacture of semiconductor devices (hereinafter recorded as a manufacture operation) by the engineer, a communication unit 131 for transmitting and receiving each message of the maintenance request, start notification, maintenance operation, and completion notification between the semiconductor manufacturing device 123 and the management device 122, a control unit 132 for executing the programs according to the maintenance operation and manufacture operation, and parts 133 controlled by the control unit 132.

The I/O unit 130 has a function for confirming an engineer whenever he starts use of the semiconductor manufacturing device 123. The engineer is discriminated by a unique identifier such as U1, U2, - - - by this confirmation. When the engineer finishes the confirmation, he inputs the manufacture operation to the I/O unit 130 so as to manufacture semiconductor devices.

The I/O unit 130 also has a function for transmitting data composed of the program identifier and parameter (hereinafter recorded as an execution request) to the control unit 132 according to the input manufacture operation and when it receives the data storing the program execution results (hereinafter recorded as an execution request response) from the control unit 132, taking out the program execution results from the execution request response, and displaying the program execution results on the display unit.

The I/O unit 130 also has a function for recording the data indicating the output mode conditions necessary to output the state of the maintenance operation (hereinafter recorded as state output authority) in the output authority management table. The state output authority is input at the factory of the device supply vendor at the time of delivery. In the state output authority, the data indicating whether display of each item of the execution date and time, identifier, and parameter of the executed program by the control unit 132 is to be permitted or not according to the output mode for identifying the state for outputting the maintenance operation state to the semiconductor manufacturing device.

The I/O unit 130 has a function for, when the unit 131 receives the data composed of the program execution date and time, program identifier, and parameter (hereinafter recorded as execution state) and the output mode for identifying the state for outputting the maintenance operation state to the semiconductor manufacturing device 123 from the control unit 132, reading the state output authority from the output authority management table, confirming whether the output authority of each item of the execution state is given or not on the basis of the received output mode, and displaying the item of the execution state to which the output authority is given, for example, on the display unit.

The communication unit 131 also has a function for periodically monitoring the operating condition of the semiconductor manufacturing device 123, generating a maintenance request composed of the status and output mode when the unit 131 detects an occurrence of a trouble, and transmitting the generated maintenance request to the management device 112 of the maintenance center 110 via the management device 122. The correspondence of the contents of each trouble to the status is predetermined. Further, the value of the output mode is input beforehand by the engineer. The maintenance request may include, in addition to the status and output mode aforementioned, for example, the trouble detection date and time, the identifier of the semiconductor factory, the identifier of the semiconductor manufacturing device, and the semiconductor manufacturing device kind.

The communication unit 131 also has a function for recording the data indicating the attribute of a service person (hereinafter recorded as a service person attribute) in the service person attribute management table. The service person attribute data is input by the engineer beforehand. In the service person attribute data, the password and technical level of the service person are stored.

The communication unit 131 also has a function for recording the data indicating the program execution authority (hereinafter recorded as program execution authority) in the execution authority management table. The execution authority data is input by the engineer beforehand. In the execution authority data, the data indicating whether or not to permit program execution according to the service person attribute indicating the attribute of the service person and the data indicating the state of the device at that point of time (hereinafter recorded as a device state) is stored. For the device state, for example, values of production, standby, engineering, plan down-time, off-plan down-time, non-planning time, and indefinite are stored.

The communication unit 131 also has a function for discriminating the maintenance operation executed by a service person by a unique identifier such as O1, O2, - - - and whenever the unit 131 receives each message of start notification, maintenance operation, and completion notification from the management device 122, corresponding the data indicating the contents of these messages (hereinafter recorded as maintenance results) to a specific identifier and recording it in the maintenance result management table. For the maintenance results, the information on when which service person on what technical level transmits what contents of a message in what output mode in what state the device is set is recorded.

The communication unit 131 also has a function for recording the data for designating the value for maintenance (hereinafter recorded as a maintenance charge list) in the maintenance charge list management table. The maintenance charge list is input at the factory of the device supply vendor at the time of delivery. In the maintenance charge list, according to the technical level of the service person, the device state when the program is executed, the kind of the read use history information, and the output mode, the information on what value is to be billed for the semiconductor manufacturer by the device vendor is recorded. The value for maintenance is set higher as the technical level of a service person is increased, higher as the possibility of adverse effect on the manufacturing process of a semiconductor manufacturer is increased, lower as the program more reads the secret information of the semiconductor manufacturer, and higher as the condition of the maintenance operation is displayed more in detail.

The communication unit 131 also has a function for, when the unit 131 receives a start notification from the management device 122, comparing the password taken out from the start notification with the service person attribute read from the service person attribute management table and confirming the service person. As mentioned above, the service person is discriminated by a unique identifier such as D1, D2, - - - by this confirmation.

The communication unit 131 has a function for, when the unit 131 receives the start notification from the management device 122, storing the output mode taken out from the start notification until it receives a completion notification.

The communication unit 131 also has a function for, when the unit 131 receives the maintenance operation from the management device 122, taking out all the commands from the maintenance operation, executing the program designated by each command, generating command responses composed of the program execution results for each command when the execution of each program ends, and transmitting the maintenance operation responses composed of these command responses to the operation device 113.

The communication unit 131 also has a function for, so as to execute the program designated by each command, reading the service person attribute of a service person from the service person attribute management table, reading the device state at that point of time from the control unit 132, reading the program execution authority of the program designated by each command, confirming whether the program execution authority designated by each command is given to the service person or not on the basis of the service person attribute and device state, transmitting an execution request composed of the program identifier and parameter and the stored output mode to the control unit 132 only when the program execution authority is given, and receiving an execution request response storing the program execution results from the control unit 132.

The communication unit 131 also has a function for reading the maintenance results and maintenance charge list respectively from the maintenance result management table and maintenance charge list management table when the unit 131 receives the completion notification from the management device 122, calculating the maintenance charge for the concerned maintenance using the maintenance charge list data and maintenance result data and requesting display of information concerning the maintenance charge, for example, on the display unit to the I/O unit 130 via the control unit 132.

The control unit 132 has a function for storing a program indicating the conditions and procedure of the process to be executed by the control unit 132 in the program management table. In each program, the information on the conditions and procedures for executing the process is stored.

The control unit 132 also has a function for, when the control unit 132 receives an execution request from the I/O unit 130, executing the program designated by the execution request using the parameter corresponding to it.

The control unit 132 also has a function for, when the control unit 132 receives an execution request from the communication unit 131, executing the program designated by the execution request using the parameter corresponding to it, transmitting the execution state composed of the program execution date and time, program identifier, and parameter and the output mode designated by the execution request to the I/O unit 130, and transmitting an execution request response storing the program execution results to the communication unit 131.

The control unit 132 also has a function for recording the data indicating the history of the program executed according to the execution request received from the I/O unit 130 (hereinafter recorded as a program execution history) in the program execution history management table. In the program execution history, the information on which engineer executes what program using what parameter is stored.

The control unit 132 also has a function for recording the data indicating the state of each part 134 controlled by the control unit 132 (hereinafter recorded as a sensor state history) in the sensor state history management table. In the sensor state history, the information on when what part is transited to what state is stored.

The control unit 132 also has a function for recording the data indicating the state of a wafer processed by each part 134 (hereinafter recorded as process results) in the process result management table. In the process results, the information on what wafer is put into what state is stored.

The control unit 132 also has a function for recording the data indicating the history of the device state (hereinafter recorded as a device state history) in the device state history management table. In the device condition history, the information on when the device is transited to what state is stored. The device state includes, for example, production, standby, engineering, plan down-time, off-plan down-time, non-planning time, and indefinite.

The control unit 132 also has a function for, when the control unit 132 receives a request from the communication unit 131, reading the device state indicating the state of the device at that point of time from the device state history management table and offering it to the communication unit 131.

Then, the structure of the table managed by the semiconductor manufacturing device 123 will be explained. FIG. 3 shows an example of the service person attribute management table managed by the communication unit 131 of the semiconductor manufacturing device 123. Each line of a service person attribute management table 140 stores the service person attribute indicating the attribute of the service person discriminated by the ID value of the service person at the top. The service person attribute is composed of the items of "Service person ID", "Password", and "Technical level".

The item of "Service person ID" stores the data indicating the identifier of the service person. The item of "Password" stores the data indicating the password of the service person. The item of "Technical level" stores the data indicating the technical level of the service person. This example indicates that the password of the service person D1 is 1234 and the technical level is a higher level and the password of the service person D2 is 5678 and the technical level is a medium level.

FIG. 4 shows an example of the device state management table managed by the control unit 132 of the semiconductor manufacturing device 123. Each line of a device state management table 141 stores the device state history indicating the history of the device state. The device state history is composed of the items of "Transition date and time" and "Device state". The item of "Transition date and time" stores the data indicating the date and time when the device state is transited. The item of "Device state" stores the data indicating the state of the transited device. This example indicates that the device is transited to the production state at 10:10:10, Jan. 2, 2001 and the device is transited to the standby state at 10:15:10, Jan. 2, 2001. In the item of "Device state", values of production, standby, engineering, plan down-time, off-plan down-time, non-planning time, and indefinite may be set.

FIG. 5 shows an example of the program management table managed by the control unit 132 of the semiconductor manufacturing device 123. Each line of a program management table 142 stores a program indicating the conditions and procedure of the process to be executed by the control unit 132. Each program is composed of the items of "Program ID", "Program kind", "Name", "Processing condition", and "Processing procedure".

The item of "Program ID" is data indicating a unique identifier allocated to each program. The item of "Program kind" is data indicating the program kind. The item of "Name" is data indicating the program name. The item of "Processing condition" is data indicating the conditions of the process to be executed by the control unit 132. The item of "Processing procedure" is data indicating the procedure of the process to be executed by the control unit 132. There may be a program requiring no setting of processing conditions.

In this example, the program P1 is a program for reading a program, indicating that the program has the use history reading kind and executes the procedure named Program read.

The program P2 is a program for reading the program execution history, indicating that the program has the use history reading kind and executes the procedure named Program execution history read.

The program P3 is a program for reading the sensor state history, indicating that the program has the use history reading kind and executes the procedure named Sensor state history read.

The program P4 is a program for reading the processing results, indicating that the program has the use history reading kind and executes the procedure named Processing result read.

The program P5 is a program for generating a program, indicating that the program has the program operation kind and executes the procedure named Program create.

The program P6 is a program for editing a program, indicating that the program has the program operation kind and executes the procedure named Program edit.

The program P7 is a program for deleting a program, indicating that the program has the program operation kind and executes the procedure named Program delete.

The program P8 is a program for processing a wafer in the automatic mode, indicating that the program sequentially executes the procedures named Wafer load, Wafer alignment, Addressing, Measurement, and Wafer unload under the condition that the program has the wafer process kind, automatically processes wafers, uses the No. 1 slot, performs the process in wafer units, and stores measured wafer images in the image 1.

The program P9 is a program for processing a wafer in the manual mode, indicating that the program executes the same procedures as those of the program P8 under the condition that the program manually processes wafers, has the wafer process kind, uses the No. 2 slot, performs the process in wafer units, and stores measured wafer images in the image 1.

FIG. 6 shows an example of the execution authority management table managed by the communication unit 131 of the semiconductor manufacturing device 123. Each line of an execution authority management table 143 stores the program execution authority indicating the execution authority of the program discriminated by the ID value of the program at the top. The program execution authority is composed of the items of "Program ID" and "Execution authority".

The item of "Program ID" stores the data indicating the program identifier. The item of "Execution authority" stores the data indicating whether or not to permit program execution for a service person according to the service person attribute of the service person requesting program execution and the state of the device at that point of time.

In this example, the execution authority is expressed by a character string of 4 characters. The first two characters indicate the execution authority for a service person that the value of the item of "Technical level" of the service person attribute is a higher level, and when the first two characters are "XX", it means permission of execution regardless of the value of device state, and "X-" means permission of execution when the value of device state is Production state and rejection of execution when the value is other than it, and "-X" means rejection of execution when the value of device state is Production state and permission of execution when the value is other than it, and "--" means rejection of execution regardless of the value of device state.

The next two characters indicate the execution authority for a service person that the value of the item of "Technical level" of the service person attribute is a medium level and the meaning thereof is the same as that of the first two characters.

The programs P1 and P2 indicate permission of execution for a service person that the value of the item of "Technical level" of the service person attribute is a higher level regardless of the value of device state and rejection of execution for a service person that the value of the item of "Technical level" of the service person attribute is a medium level.

Further, the programs P2, P3, P5, P6, and P7 indicate rejection of execution for a service person that the value of the item of "Technical level" of the service person attribute is a higher level when the value of device state is "Production" and permission of execution when the value of device state is "Others" and rejection of execution for a service person that the value of the item of "Technical level" of the service person attribute is a medium level regardless of the value of device state.

Further, the programs P8 and P9 indicate rejection of execution for every service person.

FIG. 7 shows an example of the program execution history management table managed by the communication unit 132 of the semiconductor manufacturing device 123. Each line of a program execution history management table 144 stores the program execution history indicating the history of the executed program. The program execution history is composed of the items of "Execution date and time", "Engineer ID", "Program ID", and "Parameter".

The item of "Execution date and time" stores the data indicating the date and time when the program is executed. The item of "Engineer ID" stores the data indicating the identifier of the engineer executing the program. The item of "Program ID" stores the data indicating the identifier of the executed program. The item of "Parameter" stores the data indicating the parameter given to the executed program. This example indicates that an engineer U1 executes the program P8 at 10:10:10, Jan. 2, 2001 and the engineer U1 executes the program P9 at 10:15:10, Jan. 2, 2001.

FIG. 8 shows an example of the sensor state management table managed by the communication unit 132 of the semiconductor manufacturing device 123. Each line of a sensor state history management table 145 stores the sensor state history indicating the state history of each part 133. The sensor condition history is composed of the items of "Recording date and time", "Sensor S1", "Sensor S2", - - - . The item of "Recording date and time" stores the data indicating the date and time when the state value of each part 127 is recorded.

Each item of "Sensor S1", "Sensor S2", - - - stores the data indicating the condition of each part 133 measured using each sensor. This example indicates that the condition values of the parts 133 are respectively 0.01, 0.10, - - - at 10:10:10, Jan. 2, 2001 and the condition values of the parts 133 are respectively 0.02, 0.20, - - - at 10:10:11, Jan. 2, 2001.

FIG. 9 shows an example of the processing result management table managed by the communication unit 132 of the semiconductor manufacturing device 123. Each line of a processing result management table 146 stores the processing results indicating the processing results of the wafer discriminated by the wafer ID value at the top. The processing results are composed of the items of "Wafer ID" and "Wafer image".

The item of "Wafer ID" stores the data indicating a unique identifier allocated to each wafer. The item of "Wafer image" stores the image data indicating the wafer surface state. This example indicates that the surface state of the wafer W1 is a normal pattern and the surface state of the wafer W2 is an abnormal pattern.

FIG. 10 shows an example of the output authority management table managed by the I/O unit 130 of the semiconductor manufacturing device 123. Each line of an output authority management table 147 stores the state output limit indicating the state output authority of the maintenance operation. The output limit is composed of the items of "Item" and "Output authority".

The item of "Item" is data indicating each item of the execution state. The item of "Output authority" stores the data indicating whether or not to permit display of each item of the execution state according to the output mode. In this example, the output limit is expressed by a character string of 2 characters. The character string "XX" means permission of output regardless of the output mode, and "X-" means permission of output when the value of the output mode is All display and rejection of output when it is Partial display, and "-X" means rejection of output when the value of the output mode is All display and permission of output when it is Partial display, and "--" means rejection of output regardless of the output mode.

The items of "Execution date and time" and "Program kind" indicate permission of output regardless of the value of the output mode and the items of "Program ID" and "Parameter" indicate permission of output when the value of the output mode is All display and rejection of output when it is Partial display.

FIG. 11 shows an example of the maintenance result management table managed by the communication unit 131 of the semiconductor manufacturing device 123. Each line of a maintenance result management table 148 stores the maintenance results indicating the contents of the message received from the management device 122. The maintenance results are composed of "Operation ID", "Recording date and time", Technical level", "Service person ID", "Operation condition", "Program ID", "Parameter", "Device condition", and "Output mode".

The item of "Operation ID" stores the data indicating the identifier of the maintenance operation. The item of "Recording date and time" stores the data indicating the date and time when the maintenance results are recorded. The item of "Technical level" stores the data indicating the technical level of a service person transmitting the maintenance operation. The item of "Service person ID" stores the data indicating the identifier of a service person transmitting a message. The item of "Operation state" stores the data indicating the progress of the maintenance operation. The item of "Program ID" stores the data indicating the identifier of the program executed by the maintenance operation. The item of "Parameter" stores the data indicating the parameter to be given to the program. The item of "Device state" stores the device state when the program is executed. The item of "Output mode" stores the output mode of the maintenance operation.

This example indicates that the service person is a service person D1, and the technical level is a higher level, and the output mode is Partial display. Further, the example indicates that the communication unit 131 of the semiconductor manufacturing device 123 receives a start notification at 11:10:10, Jan. 3, 2001, receives a maintenance operation for requesting reading (P2) of the program execution history at 11:15:10, Jan. 3, 2001, receives a maintenance operation for requesting reading (P3) of the sensor condition history at 11:20:10, Jan. 3, 2001, receives a maintenance operation for requesting reading (P4) of the processing results at 11:25:10, Jan. 3, 2001, receives a maintenance operation for requesting reading (P1) of the program P8 at 11:30:10, Jan. 3, 2001, receives a maintenance operation for requesting editing (P6) of the program P8 at 11:35:10, Jan. 3, 2001, receives a maintenance operation for requesting execution (P8) of the program P8 at 11:40:10, Jan. 3, 2001, receives a maintenance operation for requesting reading (P4) of the processing results at 11:45:10, Jan. 3, 2001, and receives a completion notification at 11:50:10, Jan. 3, 2001. Further, the example shows that the values of device state when the unit 131 receives the start notification and the first maintenance operation are Production state and the values of device state when the unit 131 receives the remaining maintenance operations are Standby state.

FIG. 12 shows an example of the maintenance charge list management table managed by the communication unit 131 of the semiconductor manufacturing device 123. Each table constituting a maintenance charge list management table 149 stores the maintenance charge list indicating the value to be billed for a semiconductor manufacturer by the device vendor as a collateral for the maintenance operation. The maintenance charge list management table 149 is composed of a fixed charge management table 150, a discount charge management table 151, and an extra charge management table 152.

The fixed charge management table 150 stores the data indicating the fixed charge of maintenance operation for each maintenance operation when the maintenance operation is requested for each maintenance center. The discount charge management table 151 stores the data indicating the discount charge for one program execution when each program is executed in the maintenance operation. The extra charge management table 152 stores the data indicating the extra charge of one maintenance operation when the output mode is set to each value. In this example, a higher-level service person can complete maintenance in a shorter time than a medium-level service person, so that the table 152 indicates that when a service person on the higher technical level executes maintenance, a higher fixed charge than that for a service person on the medium technical level is billed for a semiconductor manufacturer.

Further, the programs and processing results include the secret information of a semiconductor manufacturer more than the program execution history data and sensor condition history data, so that the table 151 indicates that when the programs P1, P4, and P6 are executed, the charge is discounted at a higher discount rate than that when the programs P2 and P3 are executed.

Further, when the device is in the production state, maintenance is more difficult than that when the device is in other states, so that the table 151 indicates that when maintenance is to be executed when the value of device state data is Production state, the charge is discounted at a lower discount rate than that when maintenance is executed in other states.

Further, when All display is designated to the output mode, more know-how concerning maintenance is given to the semiconductor manufacturer than that when Partial display is designated, so that the table 152 indicates that when All display is designated to the output mode and maintenance is to be executed, an extra charge is billed at a higher extra rate than that when Partial display is designated to the output mode and maintenance is to be executed.

Figure 13:
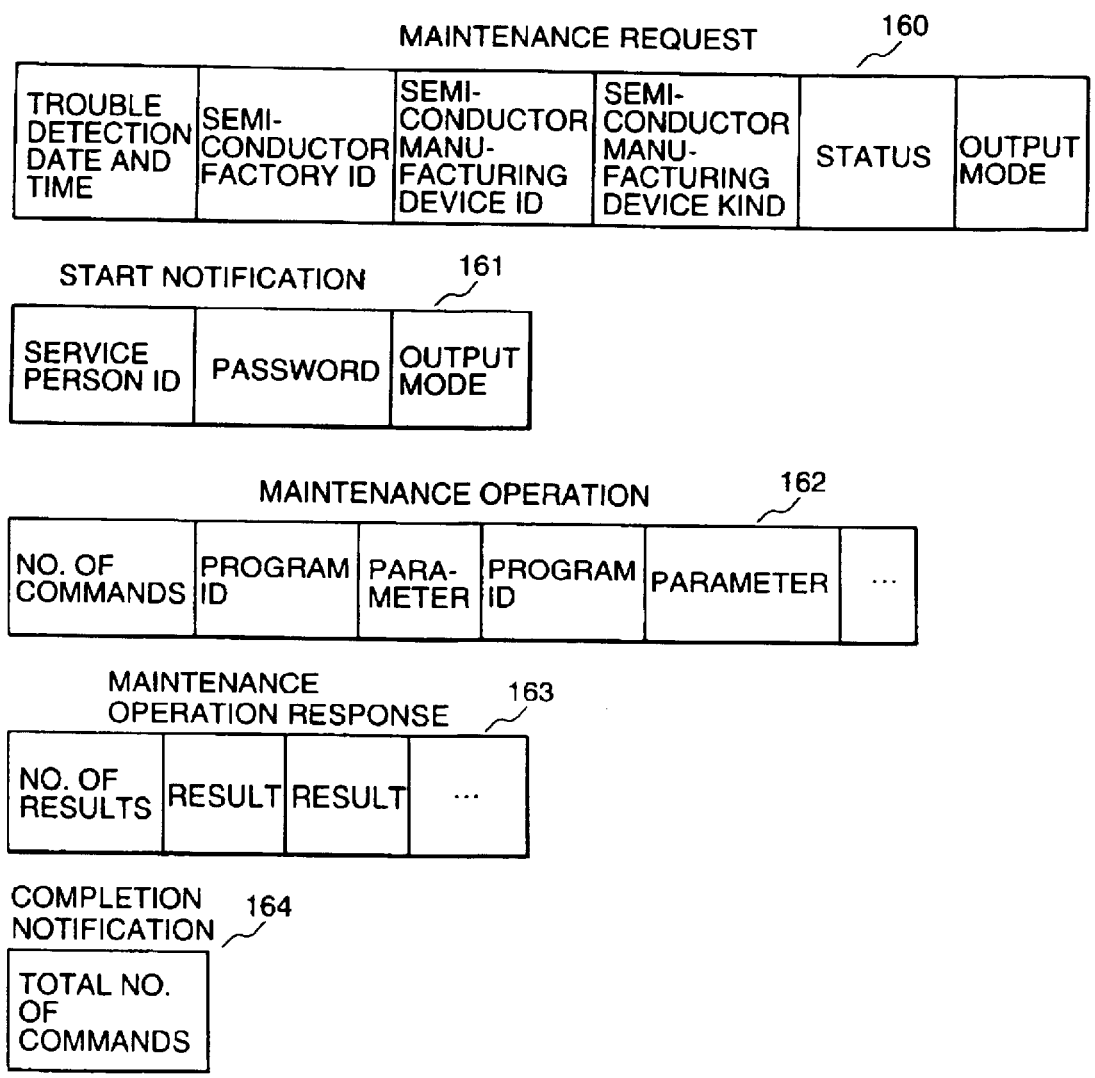
FIG. 13 is a drawing showing the structure of a message transmitted and received between the semiconductor manufacturing device and the operation device shown in FIG. 1.

Next, the structure of a message transmitted and received between the semiconductor manufacturing device 123 and the operation device 113 will be explained. FIG. 13 shows examples of messages of maintenance request, start notification, maintenance operation, maintenance operation response, and completion notification which are transmitted and received between the semiconductor manufacturing device 123 and the operation device 113. A maintenance request 160 is a message to be transmitted so as to request maintenance to the operation device 113 by the semiconductor manufacturing device 123 and it is composed of the items of "Trouble detection date and time", "Semiconductor factory ID", "Semiconductor manufacturing device ID", "Semiconductor manufacturing device kind", "Status", and "Output mode".

The item of "Trouble detection date and time" stores the data indicating the date and time when an occurrence of a trouble is detected. The item of "Semiconductor factory ID" stores the data indicating the identifier of the factory where the semiconductor manufacturing device that an occurrence of a trouble is detected is installed. The item of "Semiconductor manufacturing device ID" stores the data indicating the identifier of the semiconductor manufacturing device that the occurrence of a trouble is detected. The item of "Semiconductor manufacturing device kind" stores the data indicating the kind of the semiconductor manufacturing device that the occurrence of a trouble is detected. The item of "Status" stores the status for identifying the condition of a trouble. The item of "Output mode" stores the output mode for identifying the state for outputting the maintenance operation condition to the semiconductor device.

A start notification 161 is a message to be transmitted so as to notify the effect of start of the maintenance operation to the semiconductor manufacturing device 123 from the operation device 113 and it is composed of the items of "Service person ID", "Password", and "Output mode".

The item of "Service person ID" stores the data indicating the identifier of a service person executing the maintenance operation. The item of "Password" stores the data indicating the password of a service person executing the maintenance operation. The item of "Output mode" stores the output mode designated by a maintenance request.

A maintenance operation 162 is a message to be transmitted so as to notify a command to the semiconductor manufacturing device 123 from the operation device 113 and it is composed of the items of "No. of commands", "Program ID", "Parameter", "Program ID", "Parameter", - - - . The item of "No. of commands" is the data indicating the number of commands stored in the maintenance operation. The item of "Program ID" is the data indicating the identifier of the program to be executed by the semiconductor manufacturing device. The item of "Parameter" is the parameter to be transferred to the program to be executed by the semiconductor manufacturing device.

A maintenance operation response 163 is a message to be transmitted so as to notify the results of a command to the operation device 113 from the semiconductor manufacturing device 123 and it is composed of the items of "No. of results", "Result", "Result", - - - . The item of "No. of results" is the data indicating the number of command responses stored in the maintenance operation response. The item of "Result" is the data indicating the execution results of a program.

A completion notification 164 is a message to be transmitted so as to notify the effect of completion of the maintenance operation to the semiconductor manufacturing device 123 from the operation device 113 and it is composed of the item of "Total number of commands". The item of "Total number of commands" is the data indicating the number of commands transmitted between transmission of the start notification and transmission of the completion notification.

Figure 14:
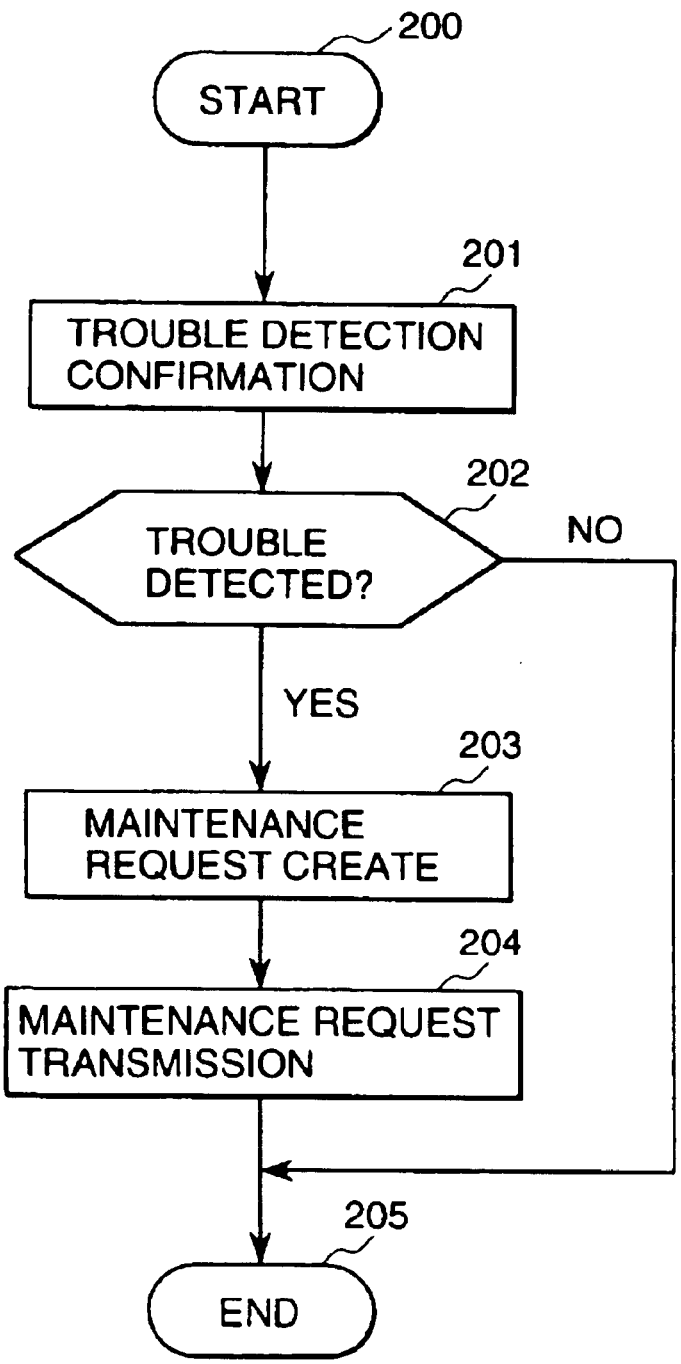
FIG. 14 is a flow chart showing the operation of the communication unit of the semiconductor manufacturing device shown in FIG. 1.

Then, the process flow of the semiconductor manufacturing device 123 and the operation device 113 shown in FIG. 4. FIG. 14 is a flow chart showing the operation of the communication unit 131 of the semiconductor manufacturing device 123. The communication unit 131 periodically executes the process indicated in the flow chart, thereby periodically monitors the operating condition of the semiconductor manufacturing device 123.

Firstly, the communication unit 131 confirms whether the unit 131 detects that a trouble occurs in the semiconductor manufacturing device 123 or not (Step 201). When the communication unit 131 detects an occurrence of a trouble, the unit 131 generates the maintenance request 160 composed of the status for identifying the trouble condition and the output mode for identifying the state for outputting the maintenance operation condition to the semiconductor device (Step 203) and when the unit 131 does not detect an occurrence of a trouble, the unit 131 ends the process (Step 205). Next, the communication unit 131 transmits the maintenance request 160 to the management device 112 of the maintenance center 110 (Step 204) and ends the process (Step 205).

Figure 15:
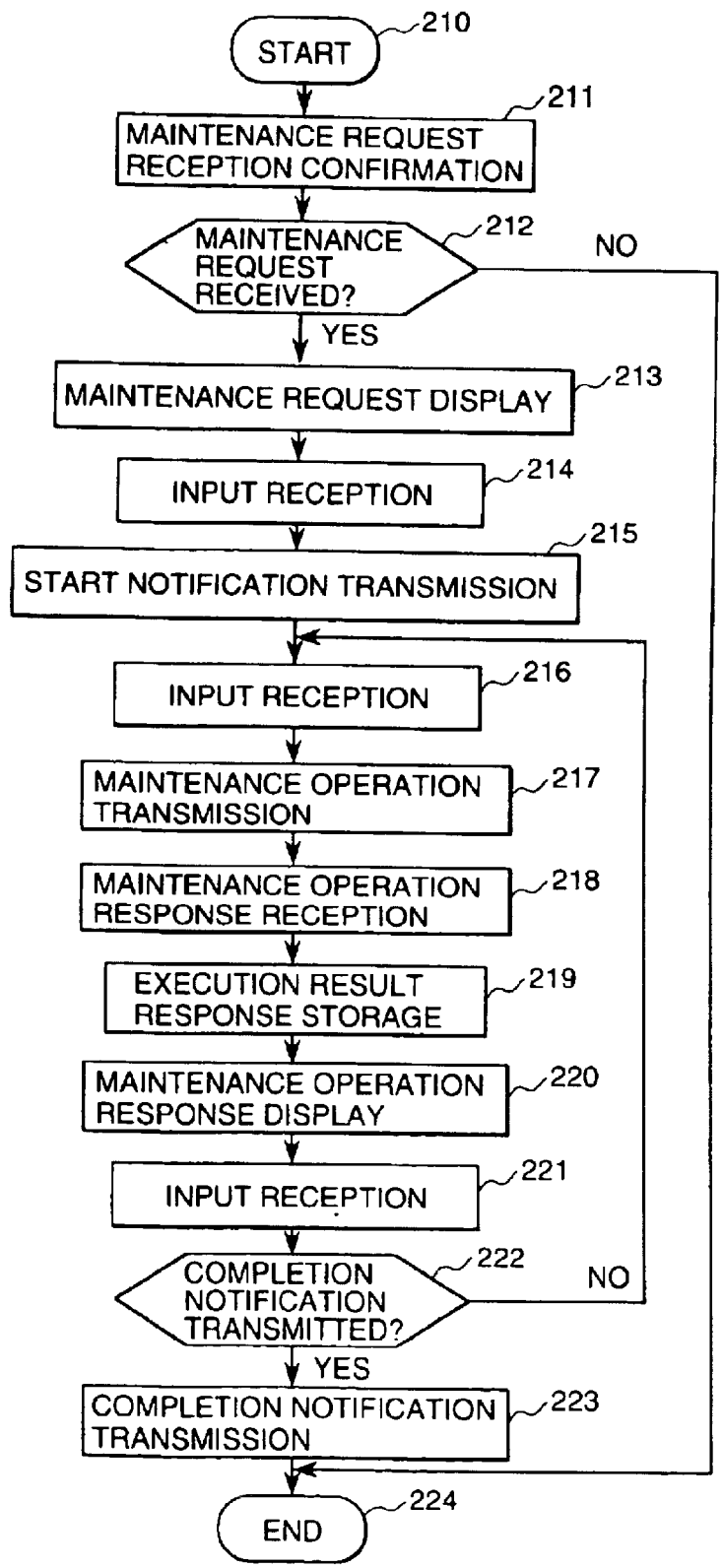
FIG. 15 is a flow chart showing the operation of the operation device shown in FIG. 1.

FIG. 15 is a flow chart showing the operation of the operation device 113. The operation device 113 periodically executes the process indicated in the flow chart, thereby transmits and receives the respective messages of the maintenance request 160, the start notification 161, the maintenance operation 162, the maintenance operation response 163, and the completion notification 164 between the operation device 113 and the semiconductor manufacturing device 123 in which a trouble is detected.

Firstly, the operation device 113 confirms whether the operation device 113 receives the maintenance request 160 from the semiconductor manufacturing device 123 or not (Step 211). When the operation device 113 receives the maintenance request 160, the operation device 113 displays the information included in the maintenance request 160, for example, on the display unit (Step 213) and when the operation device 113 does not receive the maintenance request 160, the operation device 113 ends the process (Step 224). Next, the operation device 113 receives the identifier and password of a service person which are input by the service person judging that online troubleshooting is necessary from the keyboard (Step 214). Next, when the service person presses the start notification transmission button using the mouse, the operation device 113 transmits the start notification 161 composed of the identifier and password of the service person which are input by the service person and the output mode taken out from the maintenance request to the semiconductor manufacturing device 123 transmitting the maintenance request 160 (Step 215). Next, the operation device 113 receives the command input by the service person from the keyboard so as to transmit the command to the semiconductor manufacturing device 123 and the identifier of the file for storing the program execution results (Step 216). At Step 216, the operation device 113 may receive a plurality of commands and file identifiers from the service person.

Next, when the service person presses the maintenance operation transmission button using the mouse, the operation device 113 transmits the maintenance operation 162 composed of the commands input by the service person to the semiconductor manufacturing device 123 transmitting the maintenance request 160 (Step 217). Next, the operation device 113 receives the maintenance operation response 163 transmitted from the semiconductor manufacturing device 123 in response to the transmitted maintenance operation 162 (Step 218). Next, the operation device 113 takes out all the command responses stored in the maintenance operation response 163 and stores the program execution results stored in the respective command responses in the files corresponding to them (Step 219). Next, the operation device 113 displays the effect of reception of the maintenance operation response 163 on the display unit (Step 220). Next, the operation device 113 receives an input signal from the service person (Step 221).

When the service person presses the continuation button using the mouse, the operation device 113 returns to Step 216 and continues the process and when the service person presses the completion notification transmission button, the operation device 113 transmits the completion notification 164 to the semiconductor manufacturing device 123 transmitting the maintenance request 160 (Step 223) and ends the process (Step 224).

Figure 16:
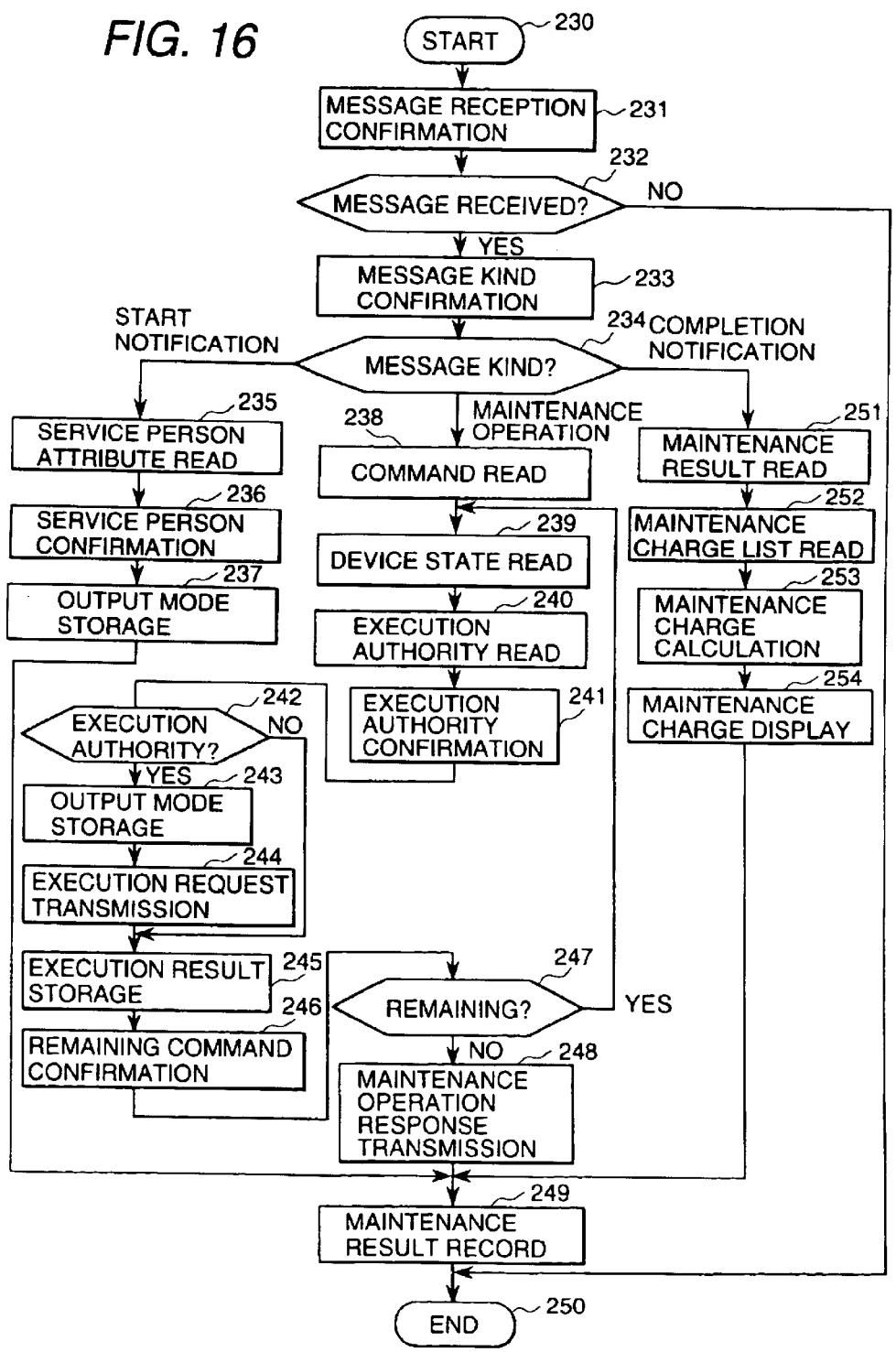
FIG. 16 is a flow chart showing the operation of the communication unit of the semiconductor manufacturing device shown in FIG. 1.

FIG. 16 is a flow chart showing the operation of the communication unit 131 of the semiconductor manufacturing device 123. The communication unit 131 periodically executes the process indicated in the flow chart, thereby executes the processes corresponding to the respective messages of the start notification 161, the maintenance operation 162, and the completion notification 164.

Firstly, the communication unit 131 confirms whether a message arrives from the operation device 113 or not (Step 231). When a message arrives, the communication unit 131 confirms which is the message, the start notification 161, or the maintenance operation 162, or the completion notification 164 (Step 233) and when no message arrives, the communication unit 131 ends the process (Step 250).

When the message confirmed at Step 233 is the start notification 161, the communication unit 131 reads the service person attribute from the service person attribute management table 140 (Step 235), confirms the service person using the read service person attribute (Step 236), stores the output mode taken out from the start notification (Step 237), records the contents of the start notification in the maintenance result management table 147 (Step 249), and ends the process (Step 250). When the message confirmed at Step 233 is the maintenance operation 162, the communication unit 131 takes out all the commands from the maintenance operation 162 (Step 238). The communication unit 131 repeats Steps 239 to 245 for the respective taken-out commands (Steps 246, 247). Firstly, the communication unit 131 reads the device state indicating the condition of the device at that point of time from the control unit 132 (Step 239). Next, the communication unit 131 reads the program execution authority designated by the command from the execution authority management table 143 (Step 240). Next, the communication unit 131 confirms whether the program execution authority designated by the command is given to the service person or not on the basis of the service person attribute and device state (Step 241).

When the execution authority is given, the communication unit 131 transmits an execution request composed of the program and parameter designated by the command and the stored output mode to the control unit 132 (Step 243), receives an execution request response from the control unit 132 (Step 244), and stores the program execution results taken out from the execution request response in the maintenance operation response 163 (Step 245) and when the execution authority is not given, the communication unit 131 stores the effect in the maintenance operation response 163 (Step 245). The communication unit 131 repeats Steps 239 to 245 for the respective taken-out commands, then transmits the maintenance operation response 163 to the operation device 113 (Step 248), records the contents of the maintenance operation 162 in the maintenance result management table 147 (Step 249), and ends the process (Step 250). When the message confirmed at Step 233 is the completion notification 164, the communication unit 131 reads the maintenance results from the maintenance result management table 147 (Step 251), reads the maintenance charge list from the maintenance charge list management table 148 (Step 252), calculates the maintenance charge for the concerned maintenance using the maintenance charge list and maintenance results (Step 253), requests the I/O unit 130 via the control unit 132 so as to display the information concerning the maintenance charge, for example, on the display unit (Step 254), records the contents of the completion notification 164 in the maintenance result management table 147 (Step 249), and ends the process (Step 250). Steps 239 and 240 may be interchanged in the processing sequence.

Figure 17:
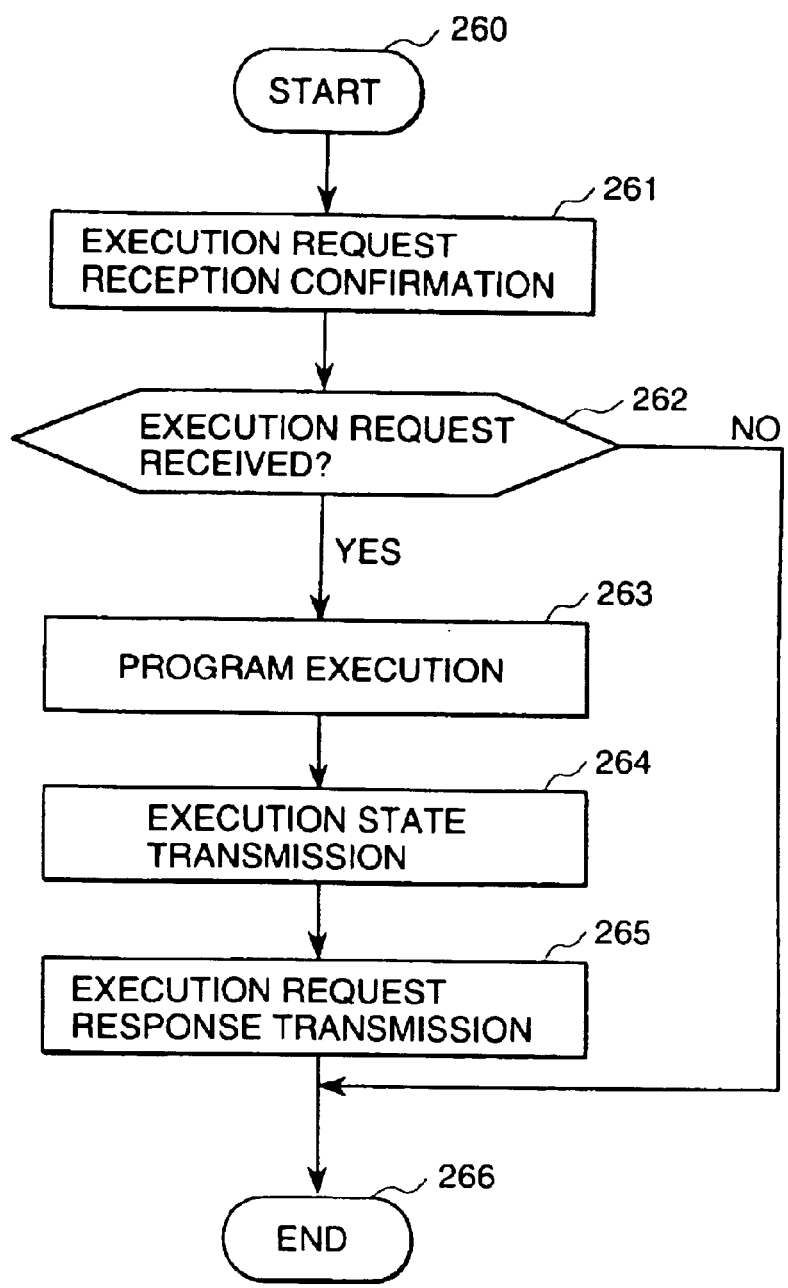
FIG. 17 is a flow chart showing the operation of the control unit of the semiconductor manufacturing device shown in FIG. 1.

FIG. 17 is a flow chart showing the operation of the control unit 132 of the semiconductor manufacturing device 123. The control unit 132 periodically executes the process indicated in the flow chart, thereby executes the program according to the execution request received from the communication unit 131.

Firstly, the control unit 132 confirms whether the execution request and output mode are received from the communication unit 131 or not (Step 261). When the execution request and output mode are received, the control unit 132 executes the program designated by the execution request using the parameter corresponding to it (Step 263) and when the program execution request does not arrive, the control unit 132 ends the process (Step 266). Next, the control unit 132 transmits the execution condition composed of the program execution date and time, program identifier, and parameter and the output mode received from the control unit 132 to the I/O unit 130 (Step 264). Next, the control unit 132 transmits an execution request response composed of the program execution results to the communication unit (Step 265) and ends the process (Step 266).

Figure 18:
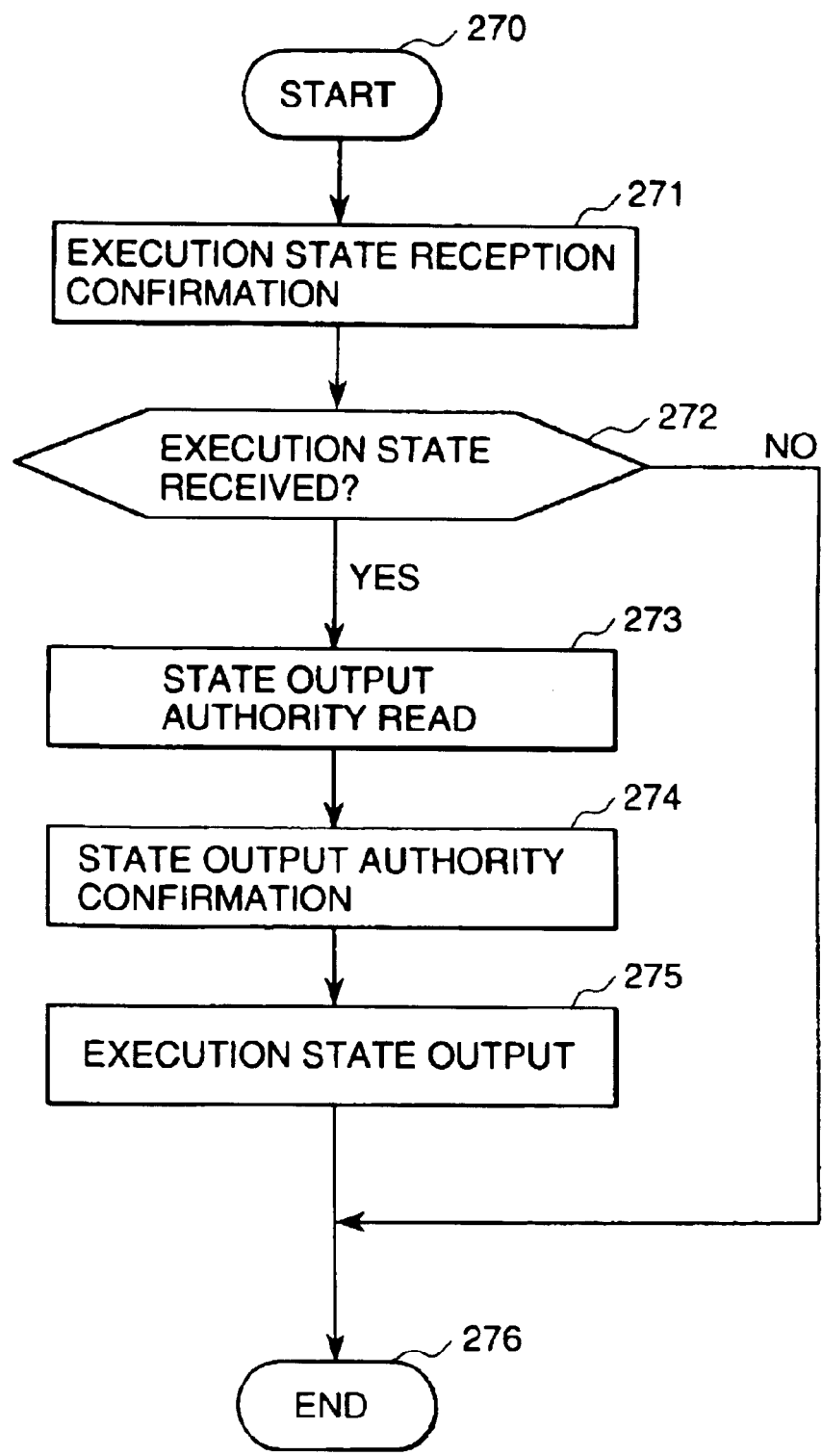
FIG. 18 is a flow chart showing the operation of the I/O unit of the semiconductor manufacturing device shown in FIG. 1.

FIG. 18 is a flow chart showing the operation of the I/O unit 130 of the semiconductor manufacturing device 123. The I/O unit 130 periodically executes the process indicated in the flow chart, thereby outputs the execution condition, for example, on the display unit.

Firstly, the I/O unit 130 confirms whether the I/O unit 130 receives the execution state and output mode from the control unit 132 or not (Step 271). When the execution condition and output mode are received, the I/O unit 130 reads the state output authority from the output authority management table (Step 273) and when the execution state and output mode are not received, the I/O unit 130 ends the process (Step 276). Next, the I/O unit 130 confirms whether the output authority of each item of the execution state is given or not on the basis of the received output mode (Step 274). Next, the I/O unit 130 displays the item of the execution state to which the output authority is given, for example, on the display unit (Step 275) and ends the process (Step 276).

Figure 19:
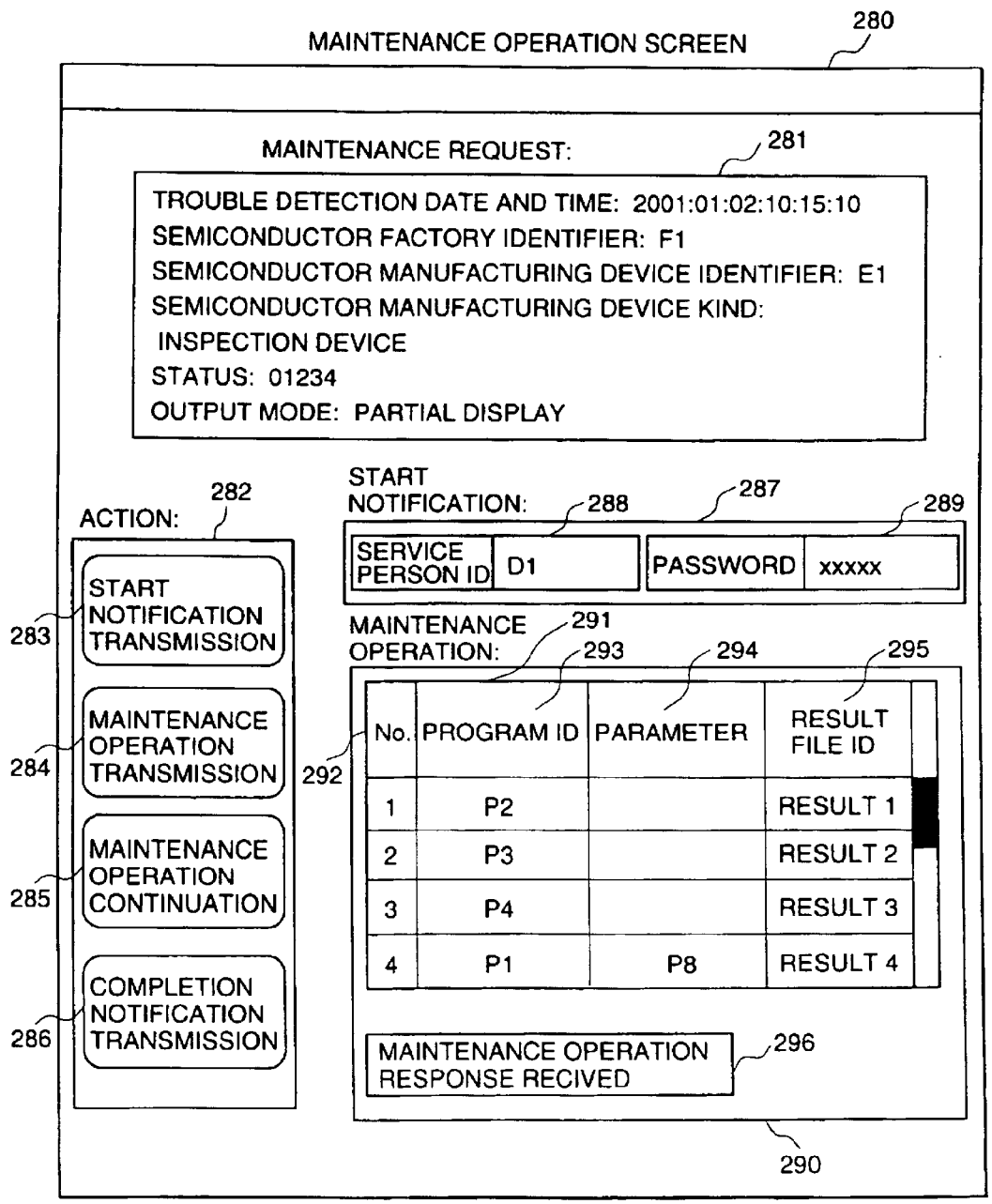
FIG. 19 is a drawing showing the maintenance operation screen to be displayed on the operation device shown in FIG. 1.

Then, the screen on the display unit on which the semiconductor manufacturing device 123 and the operation device 113 shown in FIG. 1 are displayed will be explained. FIG. 19 shows an example of the maintenance operation screen displayed on the display unit of the operation device 113 at Step 213 of the flow chart shown in FIG. 15.

A maintenance operation screen 280 is a screen for indicating the contents of the maintenance request 160 including the status and output mode to a service person and receiving an instruction of transmission of the start notification 161, transmission of the maintenance operation 162, continuation of transmission of the maintenance operation 162, or transmission of the completion notification 164 from the service person and it is composed of a maintenance request panel 281, an action panel 282, a start notification panel 287, and a maintenance operation panel 290.

The maintenance request panel 281 is a panel for displaying the contents of the maintenance request 160 received from the semiconductor manufacturing device 123 to a service person. This example indicates that the trouble detection date and time is 2001:0102:10:15:10, and the identifier of the semiconductor factory is F1, and the identifier of the semiconductor manufacturing device is E1, and the kind of the semiconductor manufacturing device is Inspection device, and the status is 01234, and the output mode is Partial display.

The action panel 282 is a panel for instructing transmission of the start notification 161, transmission of the maintenance operation 162, continuation of transmission of the maintenance operation 162, or transmission of the completion notification 164 by a service person and it is composed of a start notification transmission button 283, a maintenance operation transmission button 284, a maintenance operation continuation button 285, and a completion notification button 286. The start notification transmission button 283 is a button for instructing transmission of the start notification 152 by a service person and when the service person presses the button using the mouse, the button 283 transmits the start notification 161 composed of the service person ID and password input by the service person via a start notification panel 287 and the output mode taken out from the maintenance request 160 to the semiconductor manufacturing device 123 transmitting the maintenance request 160. The maintenance operation transmission button 284 is a button for instructing transmission of the maintenance operation 162 by a service person and when the service person presses the button using the mouse, the button 284 transmits the maintenance operation 162 composed of one or more commands input by the service person via the maintenance operation panel 290 to the semiconductor manufacturing device 123 transmitting the maintenance request 160. The maintenance operation continuation button 285 is a button for instructing continuation of transmission of the maintenance operation 162 by a service person and when the service person presses the button using the mouse, the button 285 clears the command data input by the service person via the maintenance operation panel 290. The service person can input a new command by the cleared maintenance operation panel 290. The completion notification button 286 is a button for instructing transmission of the completion notification 164 by a service person and when the service person presses the button using the mouse, the button 286 transmits the completion notification 164 composed of the data indicating the number of commands transmitted between transmission of the start notification 161 and transmission of the completion notification 164 to the semiconductor manufacturing device 123 transmitting the maintenance request 160.

The start notification panel 287 is a panel for inputting the identifier and password of a service person to be stored in the start notification 161 by the service person and it is composed of a service person ID field 288 and a password field 289.

The service person ID field 288 is a field for inputting the own service person ID by the service person using the keyboard and the password field 289 is a field for inputting the own password by the service person using the keyboard.

The maintenance operation panel 290 is a panel for inputting one or more commands to be stored in the maintenance operation 162 and the identifier of the file for storing the program execution results by a service person and displaying, when the maintenance operation response 163 is received, the effect thereof and it is composed of a command list 291 and a status panel 296. The command list 291 is a list for inputting one or more commands to be stored in the maintenance operation 153 by a service person and it is composed of a No. field 292, a program ID field 293, a parameter field 294, and a result file ID field 295. The No. field 292 is a field for inputting the command execution sequence by a service person using the keyboard, and the program ID field 293 is a field for inputting the identifier of the program to be executed by the semiconductor manufacturing device 123 by the service person using the keyboard, and the parameter field 294 is a field for inputting the parameter to be transferred to the program to be executed by the semiconductor manufacturing device 123 by the service person using the keyboard, and the result file ID field 295 is a field for inputting the identifier of the file for storing the program execution results by the service person using the keyboard.

The status panel 296 is a panel for displaying, when the maintenance operation response 163 is received, the effect thereof, and when the service person presses the maintenance operation transmission button, the status panel 296 displays a character string of, for example, "Maintenance operation is transmitted.", and when the maintenance operation response 163 is received from the semiconductor manufacturing device 123, the status panel 296 displays a character string of, for example, "Maintenance operation response is received."

FIG. 20 shows an example of the execution state output screen displayed on the display unit of the semiconductor manufacturing device 123 at Step 275 of the process flow shown in FIG. 18. An execution state output screen 300 is a screen for displaying the state of the maintenance operation to an engineer and it is composed of an execution state panel 301. The execution state panel 301 is a panel for displaying the state of the maintenance operation to the engineer and it is composed of an execution state list 302.

The execution state list 302 is a list for displaying the state of the maintenance operation to an engineer and it is composed of an execution date and time field 303, a program kind field 304, a program ID field 305, and a parameter field 306. The execution date and time field 303 displays the data indicating the date and time when the program is executed. The program kind field 304 displays the data indicating the program kind. The program ID field 305 displays the data indicating the identifier of the program to be executed by the maintenance operation. The parameter field 306 displays the data indicating the parameter to be given to the program. This example is an example when the output mode is Partial display. Actually, the reading (P2) of the program execution history is executed at 11:15:10, Jan. 3, 2001, and the reading (P3) of the sensor condition history is executed at 11:20:10, Jan. 3, 2001, and the reading (P4) of the processing results is executed at 11:25:10, Jan. 3, 2001, and the reading (P1) of the program P8 is executed at 11:30:10, Jan. 3, 2001, and the editing (P6) of the program P8 is executed at 11:35:10, Jan. 3, 2001, and the execution (P8) of the program P8 is executed at 11:40:10, Jan. 3, 2001, and the reading (P4) of the processing results is executed at 11:45:10, Jan. 3, 2001, though only the execution date and time and program kind are displayed.

Figure 21:
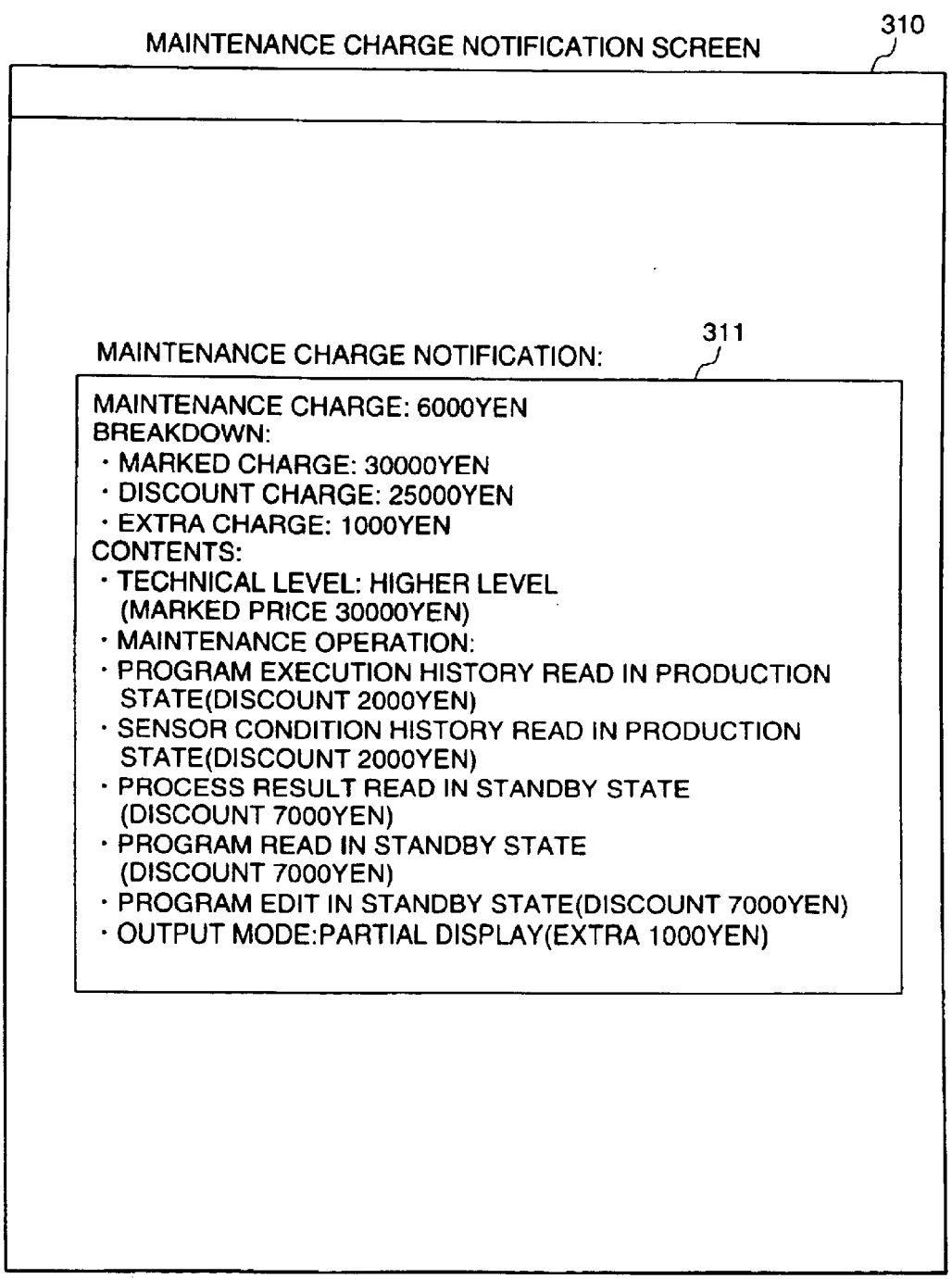
FIG. 21 is a drawing showing the maintenance charge notification screen to be displayed on the semiconductor manufacturing device shown in FIG. 1.

FIG. 21 shows an example of the maintenance charge notification screen displayed on the display unit of the semiconductor manufacturing device 123 at Step 254 of the process flow shown in FIG. 16. A maintenance charge notification screen 310 is a screen for indicating the information concerning the maintenance charge to an engineer and it is composed of a maintenance charge notification panel 311.

The maintenance charge notification panel 311 is a panel for displaying the value to be billed for a semiconductor manufacturer by the device vendor to the engineer. This example indicates that the maintenance charge is 6000 yen, and the marked charge is 30000 yen, and the discount charge is 25000 yen, and the extra charge is 1000 yen. The example additionally indicates that the marked charge is 30000 yen because the technical level of a service person is a higher level, and 2000 yen is discounted because the program execution history in the production state is read, and 2000 yen is discounted because the sensor state history in the production state is read, and 7000 yen is further discounted because the processing results are read in the standby state, and 7000 yen is discounted because the program is read in the standby state, and 7000 yen is discounted because the program is edited in the standby state, and 1000 yen is surcharged because Partial display is designated to the output mode.

As mentioned above, in the system of this embodiment, the semiconductor manufacturing device and operation device are connected via Internet, and the operation device transmits the maintenance operation to the semiconductor manufacturing device, and the semiconductor manufacturing device executes the process according to the received maintenance operation, generates maintenance charge information according to the contents of the executed process, and outputs the generated charge information on the screen of the semiconductor manufacturing device, so that it is possible to execute control and thorough services and billing according to the contents of the maintenance operation performed by the semiconductor manufacturing device.

Further, the semiconductor manufacturing device holds the data indicating the technical level of a service person in the service person attribute and generates maintenance charge information according to the maintenance attribute data of a service person transmitting the maintenance operation, so that it is possible to execute control and thorough services and billing according to the technical degree held by a service person.

Further, the semiconductor manufacturing device holds the data indicating the processing state of the semiconductor manufacturing device in the device state data and generates maintenance charge information according to the device state data at the point of time of execution of the process, so that it is possible to execute control and thorough services and billing according to the possibility of adversely affecting the production process of a semiconductor manufacturer.

Further, the semiconductor manufacturing device stores the use history information indicating the history of use of the semiconductor manufacturing device and generates maintenance charge information according to the kind of use history information read according to the maintenance operation, so that it is possible to execute control and thorough services and billing according to the secrete information obtained from a semiconductor manufacturer.

Further, the semiconductor manufacturing device outputs the processing state executed according to the maintenance operation to an engineer and generates maintenance charge information according to the contents of the output state, so that it is possible to execute control and thorough services and billing according to the know-how concerning maintenance provided by the device supply vendor.

Further, the semiconductor manufacturing device holds the service person attribute indicating the attribute of a service person and the program execution authority indicating the attribute conditions necessary for process execution, and when the maintenance operation is received from the operation device, reads the service person attribute and program execution authority, and only when the attribute of the service person attribute does not satisfy the condition of the program execution condition, can limit the access according to the attribute of the service person.

Further, the semiconductor manufacturing device holds the device state indicating the state of the semiconductor manufacturing device and the program execution authority indicating the state necessary for process execution, and when the maintenance operation is received from the operation device, reads the device state at that point of time and the program execution authority, and only when the state in the device state satisfies the condition in the program execution condition, executes the process according to the maintenance operation, so that it is possible to limit the access according to the device state.

Further, the semiconductor manufacturing device holds the output mode for identifying the state for outputting the maintenance operation state to the semiconductor device and the state output authority indicating the output mode condition necessary to output the maintenance operation state, and when the maintenance operation is received from the operation device, reads the output mode and state output authority, and only when the state in the output mode satisfies the condition in the state output authority, outputs the maintenance operation state to the semiconductor device, so that it is possible to limit the output according to the output mode.

The embodiment of the present invention is explained above. However, the present invention may be varied variously in addition to it. The second embodiment is a modification of the first embodiment. In the first embodiment, the semiconductor manufacturing device 123 calculates a maintenance charge using the maintenance charge list input at the factory of the device supply vendor at the time of shipment. However, in this embodiment, the maintenance charge is calculated using the maintenance charge list supplied from the operation device 113 of the maintenance center 110 after delivery from the factory.

In the system to which the present invention is applied, a new function indicated below is added to the operation device 113 and the communication unit 131 of the semiconductor manufacturing device 123. However, the constitution other than it is the same as that of the system explained in the first embodiment.

When the service person judges that online supply of the maintenance charge list is necessary, he inputs the maintenance charge list using the keyboard and presses the charge list operation button using the mouse. The operation device 113 also has a function for transmitting a message composed of the maintenance charge list input by the service person (hereinafter recorded as a charge list operation) to the semiconductor manufacturing device 123 online via the management device 112 and the management device 122.

The communication unit 131 of the semiconductor manufacturing device 123 also has a function for, when the unit 131 receives the charge list operation from the management device 122, taking out the maintenance charge list from the received charge list operation and recording it in the maintenance charge list management table 149.

Figure 22:
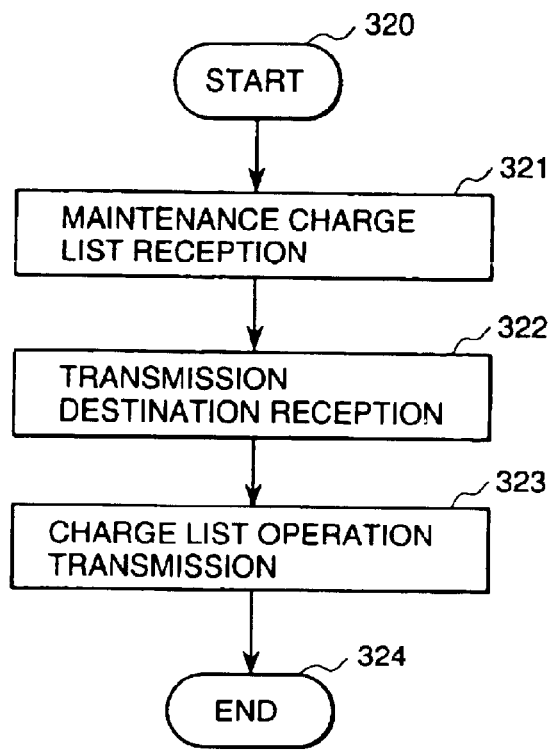
FIG. 22 is a flow chart showing the operation of the operation device shown in FIG. 1.

Then, the process flow of the operation device 113 and the semiconductor manufacturing device 123 shown in FIG. 1 will be explained. FIG. 22 is a flow chart showing the operation of the operation device 113. The operation device 113 executes the process indicated in the flow chart, thereby transmits the charge list operation to the specific semiconductor manufacturing device 123.

Firstly, the operation device 113 receives the maintenance charge list which is input by a service person judging that online supply of the maintenance charge list is necessary using the keyboard (Step 321). Next, the operation device 113 receives the transmission destination of the charge list operation which is input by the service person inputting the maintenance charge list using the keyboard (Step 322). Next, when the service person presses the charge list operation transmission button using the mouse, the operation device 113 transmits the charge list operation composed of the maintenance charge list input by the service person to the semiconductor manufacturing device 123 designated by the service person (Step 323) and ends the process (Step 324). The process sequence of Steps 321 and 322 may be interchanged.

Figure 23:
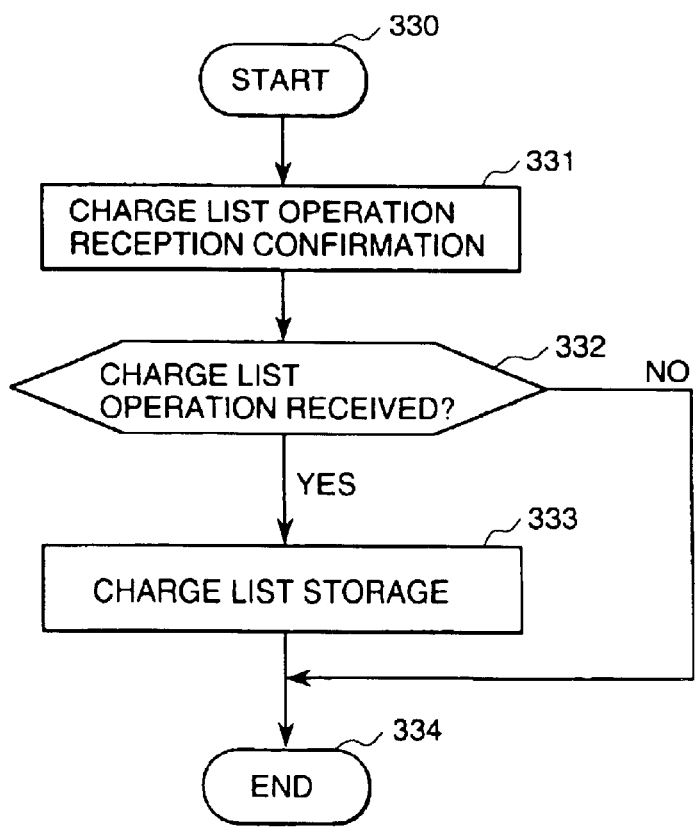
FIG. 23 is a flow chart showing the operation of the communication unit of the semiconductor manufacturing device shown in FIG. 1.

FIG. 23 is a flow chart showing the operation of the communication unit 131 of the semiconductor manufacturing device 123. The communication unit 131 periodically executes the process indicated in the flow chart, thereby executes the process according to the charge list operation received from the operation device 113.

Firstly, the communication unit 131 confirms whether the unit 131 receives the charge list operation from the operation device 113 or not (Step 331). When the unit 131 receives the charge list operation, the unit 131 takes out the maintenance charge list from the charge list operation and stores it in the maintenance charge list management table 149 (Step 333) and ends the process (Step 334). Even when the charge list operation does not arrive, the communication unit 131 ends the process (Step 334).

Then, the screen to be displayed on the display unit of the operation device 113 shown in FIG. 1 will be explained. FIG. 24 shows an example of the maintenance charge setting screen to be displayed on the display unit of the operation device 113 at Step 321 of the process flow shown in FIG. 22.

A maintenance charge setting screen 340 is a screen for receiving an instruction of transmission of the maintenance charge list and charge list operation from a service person and it is composed of a maintenance charge list panel 341, a transmission destination panel 347, and an action panel 345. The maintenance charge list panel 341 is a panel for receiving the maintenance charge list from the service person and it is composed of a marked charge list 342, a discount charge list 343, and an extra charge list 344. The marked charge list 342 is a list for inputting the data concerning the marked charge to be stored in the charge list operation by the service person. The data items to be stored in the list are the same as those of the marked charge management table 150 constituting the maintenance charge list management table 149 explained in FIG. 12, so that the explanation therefor will be omitted. The discount charge list 343 is a list for inputting the data concerning the discount charge to be stored in the charge list operation by the service person. The data items to be stored in the list are also the same as those of the discount charge management table 151 constituting the maintenance charge list management table 149 explained in FIG. 12, so that the explanation therefor will be omitted. The extra charge list 344 is a list for inputting the data concerning the extra charge to be stored in the charge list operation by the service person. The data items to be stored in the list are also the same as those of the extra charge management table 152 constituting the maintenance charge list management table 149 explained in FIG. 12, so that the explanation therefor will be omitted.

The transmission destination panel 347 is a panel for receiving the transmission destination of the charge list operation from a service person and it is composed of a semiconductor factory list 348, a transmission destination panel 351, a semiconductor manufacturing device list 352, and a transmission destination panel 355. The semiconductor factory list 348 is a list for indicating the identifier of the semiconductor factory 120 capable of transmitting the charge list operation to the service person and it is composed of a No. field 349 and a semiconductor factory field 350. The No. field 349 is a field for indicating the serial numbers of the list and the semiconductor factory field 350 is a field for indicating the identifier of the semiconductor factory 120 capable of transmitting the charge list operation. The transmission destination panel 351 is a panel for indicating the identifier of the semiconductor factory 120 designated by the service person and when the service person presses the identifier of a specific candidate of the semiconductor factory list 347 using the mouse, the identifier of the pressed semiconductor factory 120 is displayed in connection with it.

The semiconductor manufacturing device list 352 is a list for indicating the identifier of the semiconductor manufacturing device 123 capable of transmitting the charge list operation to the service person and it is composed of a No. field 353 and a semiconductor manufacturing device field 354. The No. field 353 is a field for indicating the serial numbers of the list, and the semiconductor manufacturing device field 354 is a field for indicating the identifier of the semiconductor manufacturing device 123 capable of transmitting the charge list operation, and when the service person presses the identifier of a specific candidate of the semiconductor factory list 348 using the mouse, the identifier of the semiconductor manufacturing device 123 capable of transmitting the charge list operation in the pressed semiconductor factory is displayed in connection with it.

The transmission destination panel 355 is a panel for indicating the identifier of the semiconductor manufacturing device 123 designated by the service person and when the service person presses the identifier of a specific candidate of the semiconductor manufacturing device list 353 using the mouse, the identifier of the pressed semiconductor manufacturing device 123 is displayed in connection with it.

The action panel 345 is a screen for receiving an instruction of transmission of the charge list operation from a service person and it is composed of a charge list operation transmission button 346. The charge list operation transmission button 346 is a button for instructing transmission of the charge list operation by the service person and when the service person presses the button using the mouse, the button 346 transmits the charge list operation composed of the maintenance charge list which is input by the service person via the maintenance charge list panel 241 to the semiconductor manufacturing device 123 designated by the service person via the transmission destination panel 346.

As mentioned above, in the system of this embodiment, the system of the first embodiment is modified so that the operation device 113 transmits the maintenance charge list to the semiconductor manufacturing device 123 and the semiconductor manufacturing device 123 generates charge information using the received maintenance charge list, so that the maintenance charge list can be easily changed.

The third embodiment is a modification of the first embodiment. In the third embodiment, the semiconductor manufacturing device 123 limits the output to the I/O unit using the state output authority input at the factory of the device supply vendor at the time of shipment. However, in this embodiment, the output to the I/O unit 130 is limited using the condition output authority supplied from the operation device 113 of the maintenance center 110 after delivery from the factory.

In the system to which the present invention is applied, a new function indicated below is added to the operation device 113 and the communication unit 131 of the semiconductor manufacturing device 123. However, the constitution other than it is the same as that of the system explained in the first embodiment.

When the service person judges that online supply of the state output authority is necessary, he inputs the state output authority using the keyboard and presses the state output operation transmission button using the mouse. The operation device 113 also has a function for transmitting a message composed of the state output authority input by the service person (hereinafter recorded as an output authority operation) to the semiconductor manufacturing device 123 online via the management device 112 and the management device 122.

The communication unit 131 of the semiconductor manufacturing device 123 also has a function for, when the unit 131 receives the output authority operation from the management device 122, taking out the state output authority from the received output authority operation and transmitting the taken-out state output authority to the I/O unit 130 via the control unit 132. The I/O unit 130 of the semiconductor manufacturing device 123 also has a function for, when the unit 130 receives the condition output authority from the communication unit 131, storing the received state output authority in the output authority management table 146.

Figure 25:
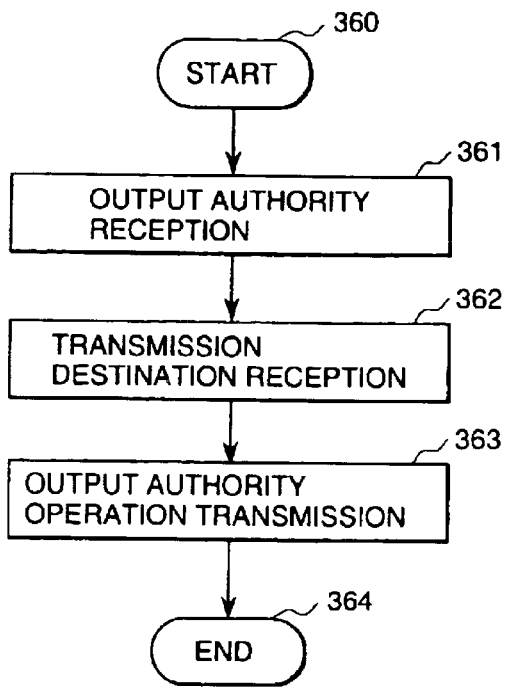
FIG. 25 is a flow chart showing the operation of the operation device shown in FIG. 1.

Then, the process flow of the operation device 113 and the semiconductor manufacturing device 123 shown in FIG. 1 will be explained. FIG. 25 is a flow chart showing the operation of the operation device 113. The operation device 113 executes the process indicated in the flow chart, thereby transmits the output authority operation to the specific semiconductor manufacturing device 123.

Firstly, the operation device 113 receives the condition output authority which is input by a service person judging that online supply of the condition output authority is necessary using the keyboard (Step 361). Next, the operation device 113 receives the transmission destination of the output authority operation which is input by the service person inputting the condition output authority using the keyboard (Step 362). Next, when the service person presses the output authority operation transmission button using the mouse, the operation device 113 transmits the output authority operation composed of the condition output authority input by the service person to the semiconductor manufacturing device 123 designated by the service person (Step 363) and ends the process (Step 364). The process sequence of Steps 361 and 362 may be interchanged.

Figure 26:
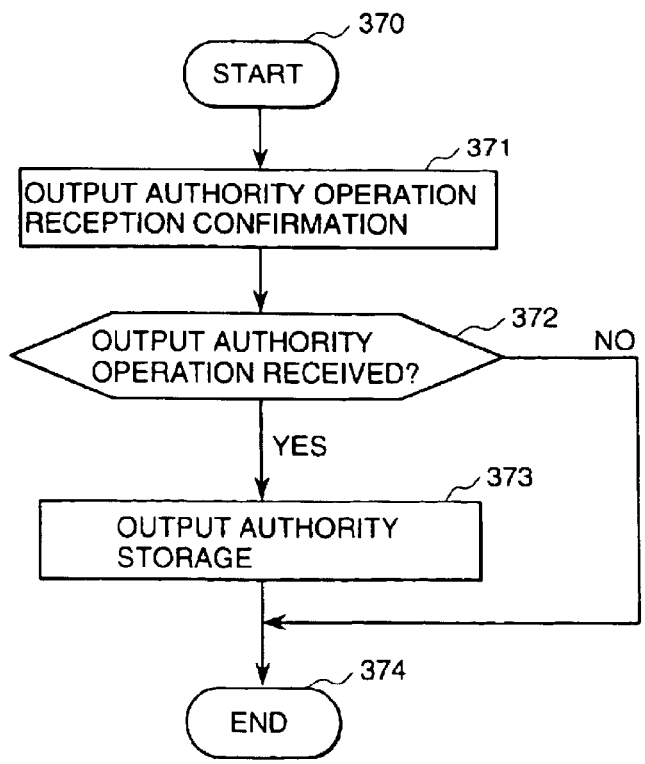
FIG. 26 is a flow chart showing the operation of the communication unit of the semiconductor manufacturing device shown in FIG. 1.

FIG. 26 is a flow chart showing the operation of the communication unit 131 of the semiconductor manufacturing device 123. The communication unit 131 periodically executes the process indicated in the flow chart, thereby executes the process according to the output authority operation received from the operation device 113.

Firstly, the communication unit 131 confirms whether the unit 131 receives the output authority operation from the operation device 113 or not (Step 371). When the communication unit 131 receives the output authority operation, the unit 131 takes out the state output authority from the output authority operation, transmits the taken-out state output authority to the I/O unit 130 via the control unit 132 (Step 373), and ends the process (Step 374). Even when the communication unit 131 does not receive the output authority operation, the unit 131 ends the process (Step 374).

Then, the screen to be displayed on the display unit of the operation device 113 shown in FIG. 1 will be explained. FIG. 27 shows an example of the state output authority setting screen to be displayed on the display unit of the operation device 113 at Step 361 of the process flow shown in FIG. 25. A state output authority setting screen 380 is a screen for receiving an instruction of transmission of the state output authority and output authority operation from a service person and it is composed of a state output authority panel 381, a transmission destination panel 385, and an action panel 383.

The state output authority panel 381 is a panel for receiving the state output authority from the service person and it is composed of a state output authority list 382. The state output authority list 382 is a list for inputting the state output authority to be stored in the output authority operation by the service person. The data items to be stored in the list are the same as those of the state output authority constituting the output authority management table 147 explained in FIG. 10, so that the explanation therefor will be omitted. The transmission destination panel 385 is a panel for receiving the transmission destination of a maintenance request from the service person. The panel is the same as the transmission destination panel 347 explained in FIG. 24, so that the explanation therefor will be omitted.

The action panel 383 is a screen for receiving an instruction of transmission of the output authority operation from the service person and it is composed of an output authority operation transmission button 384. The output authority operation transmission button 384 is a button for instructing transmission of the output authority operation by the service person and when the service person presses the button using the mouse, the button 384 transmits the output authority operation composed of the state output authority input by the service person via the state output authority panel 381 to the semiconductor manufacturing device 123 designated by service person via the transmission destination panel 385.

As mentioned above, in the system of this embodiment, the system of the first embodiment is modified so that the operation device transmits the state output authority to the semiconductor manufacturing device 123 and the semiconductor manufacturing device 123 limits the output of the maintenance operation state using the received output authority data, so that the state output authority can be easily changed.

Figure 28:
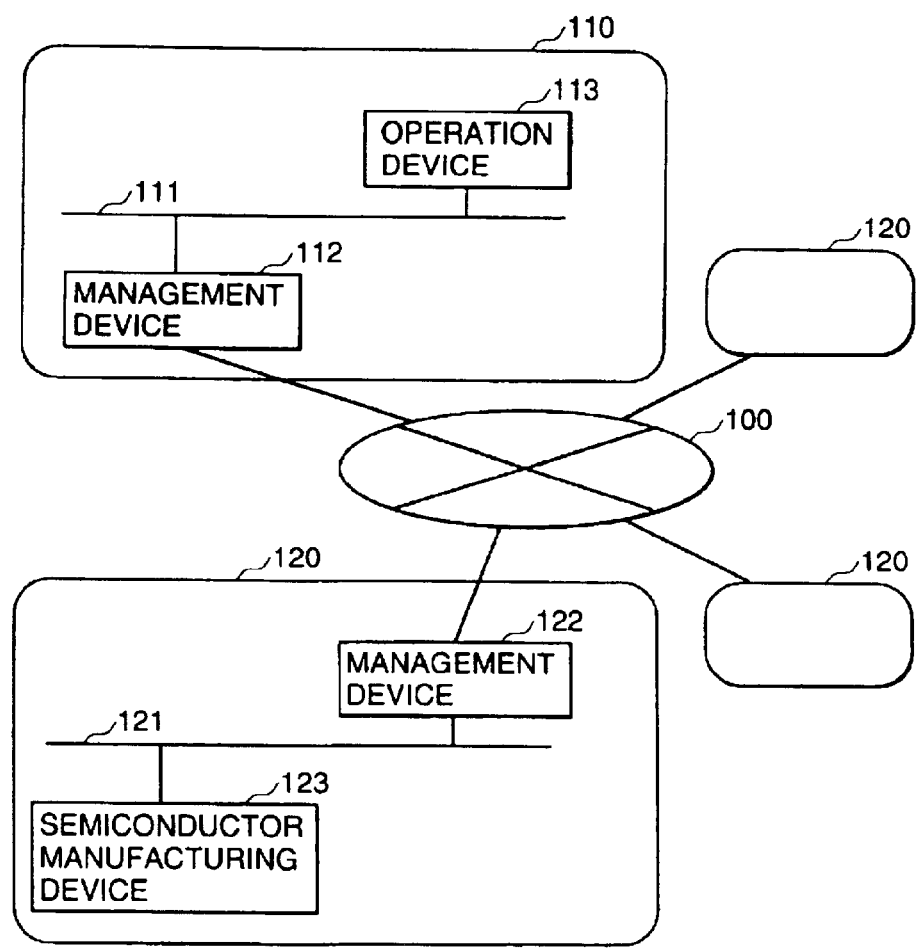
FIG. 28 is a block diagram showing the constitution of the system of the second embodiment of the present invention.

The fourth embodiment of the present invention will be explained in detail. FIG. 28 is a block diagram showing the constitution of a remote maintenance system of a semiconductor manufacturing device to which the present invention is applied. In the first embodiment, the maintenance center 110 and one or more semiconductor factories 120 are connected via Internet 100 and a maintenance request is transmitted to the same maintenance center. However, in this embodiment, one or more maintenance centers 110 and one or more semiconductor factories 120 are connected via Internet 100 and thorough billing is enabled according to the transmission destination of a maintenance request.

In the system shown in FIG. 28, two maintenance centers 110 and two factories 120 are indicated. However, actually, more than two maintenance centers 110 and factories 120 may be installed. Further, the maintenance centers 110 respectively may belong to different maintenance vendors or the same maintenance vendor and the factories 120 respectively may belong to different semiconductor manufacturers or the same semiconductor manufacturer.

In the system to which the present invention is applied, a new function to be explained next is added to the communication unit 131 of the semiconductor manufacturing device 123. However, the constitution of each device other than it is the same as that of the system explained in the first embodiment.

The communication unit 131 of the semiconductor manufacturing device 123 has a function for periodically monitoring the operating condition of the semiconductor manufacturing device 123, when the unit 131 detects an occurrence of a trouble, generating a maintenance request composed of the status for identifying the condition of the trouble and the output mode for identifying the state for outputting the maintenance operation state to the semiconductor manufacturing device 123, selecting one or more maintenance centers 110 to be notified of the generated maintenance request or candidates of the operation device 113, displaying the selected candidates, for example, on the display unit of the I/O unit 130, and transmitting the maintenance request 160 to the management device 112 of the maintenance center 110 designated by an engineer from the displayed candidates.

Figure 29:
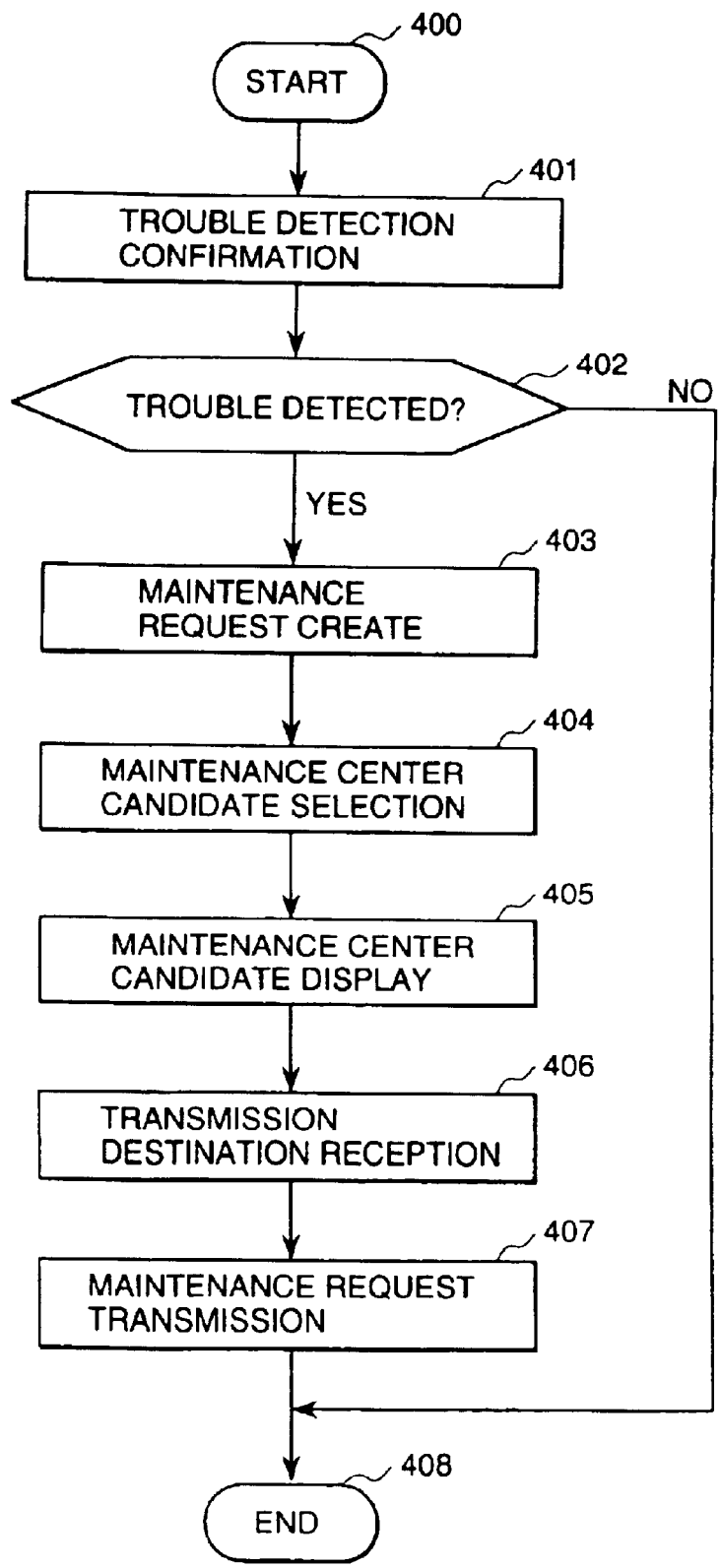
FIG. 29 is a flow chart showing the operation of the communication unit of the semiconductor manufacturing device shown in FIG. 28.

Then, the process flow of the semiconductor manufacturing device 123 shown in FIG. 28 will be explained. FIG. 29 is a flow chart showing the operation of the communication unit 131 of the semiconductor manufacturing device 123. The communication unit 131 periodically executes the process indicated in the flow chart, thereby periodically monitors the operating condition of the semiconductor manufacturing device 123.

Firstly, the communication unit 131 confirms whether the unit 131 detects that a trouble occurs in the semiconductor manufacturing device 123 or not (Step 401). When the communication unit 131 detects an occurrence of a trouble, the unit 131 generates the maintenance request 160 composed of the status for identifying the trouble condition and the output mode for indicating identifying of the state for outputting the maintenance operation state to the semiconductor device (Step 403) and when the unit 131 does not detect an occurrence of a trouble, the unit 131 ends the process (Step 408).

Next, the communication unit 131 selects one or more candidates of maintenance center 110 to be notified of the generated maintenance request 160 according a predetermined rule (Step 404). Next, the communication unit 131 displays the selected candidates, for example, on the display unit of the I/O unit 130 (Step 405). Next, the communication unit 131 receives an actual transmission destination selected by an engineer from the displayed candidates (Step 406). Next, the communication unit 131 transmits the maintenance request 160 to the management device 112 of the maintenance center 110 designated by the engineer (Step 407) and ends the process (Step 408).

Figure 30:
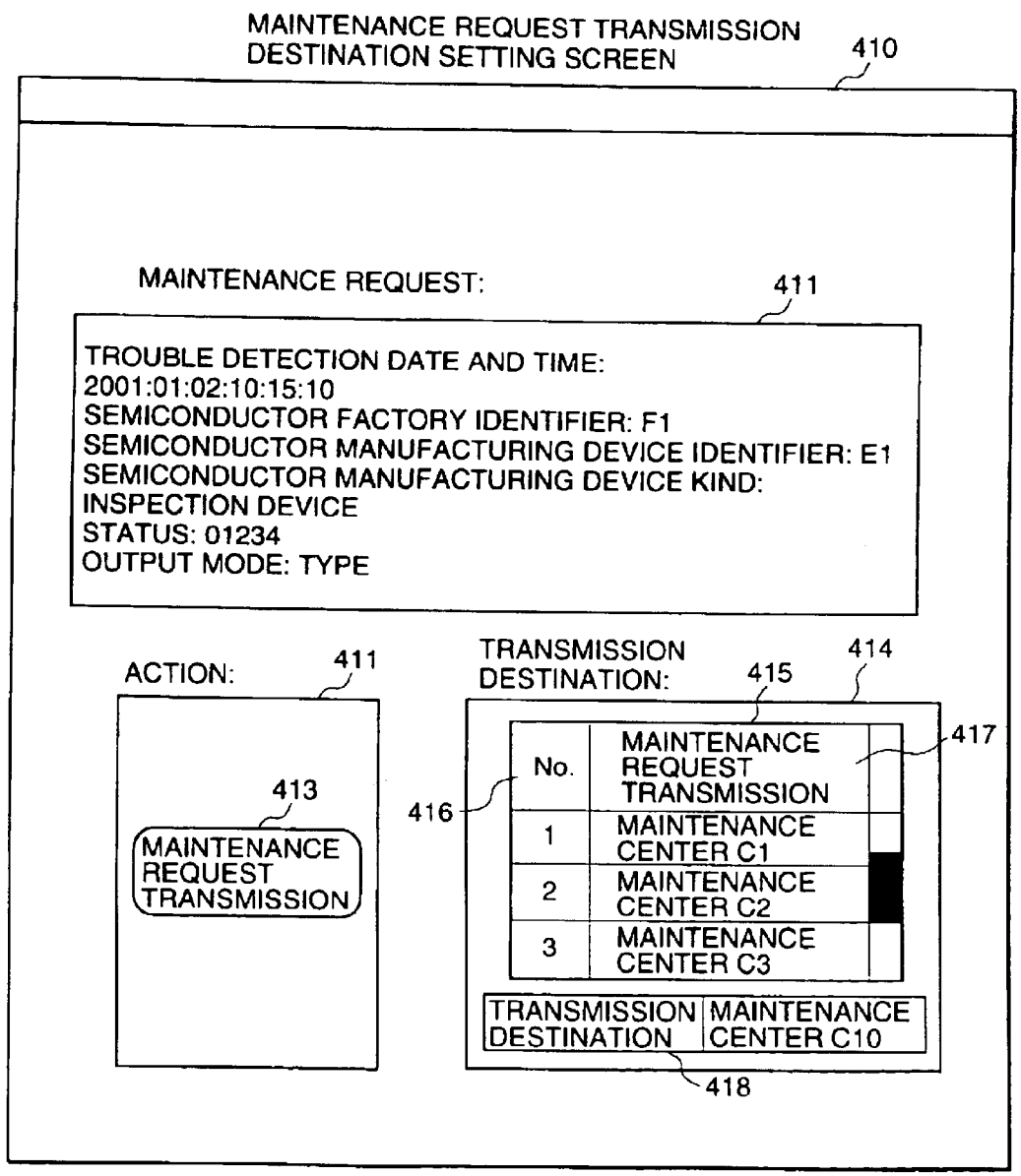
FIG. 30 is a drawing showing the maintenance request transmission destination setting screen to be displayed on the semiconductor manufacturing device shown in FIG. 28.

Then, the screen to be displayed on the display unit of the I/O unit 130 of the semiconductor manufacturing device 123 shown in FIG. 28 will be explained. FIG. 30 shows an example of the maintenance request transmission destination setting screen to be displayed on the I/O unit 130 of the semiconductor manufacturing device 123 at Step 405 of the process flow shown in FIG. 29.

A maintenance request transmission destination setting screen 410 is a screen for indicating the selected candidates of the maintenance center 110 to an engineer and receiving an instruction of transmission of the transmission destination of the maintenance request 160 and the maintenance request 160 from the engineer and it is composed of a maintenance request panel 411, an action panel 412, and transmission destination panel 414.

The maintenance request panel 411 is a panel for displaying the contents of the maintenance request 160 to be transmitted to the engineer. In this example, the same contents as those of the maintenance request panel 281 shown in FIG. 19 are indicated. The action panel 412 is a panel for instructing transmission of the maintenance request 160 by the engineer and it is composed of a maintenance request transmission button 413. The maintenance request transmission button 413 is a button for instructing transmission of the maintenance request 160 by the engineer and when the engineer presses the button using the mouse, the button 413 transmits the maintenance request 160 to the transmission destination designated by the engineer from the candidates via the transmission destination panel 414.

The transmission destination panel 414 is a panel for indicating the candidates of the maintenance center 110 selected by communication unit 131 to the engineer and receiving the transmission destination of the maintenance request 160 from the engineer and it is composed of a maintenance center candidate list 415 and a transmission destination panel 418. The maintenance center candidate list 415 is a list for indicating the candidates of the maintenance center 110 selected by the communication unit 131 to the engineer and it is composed of a No. panel field 416 and a maintenance center candidate field 417. The No. field 416 is a field for displaying the serial numbers of candidates and the maintenance center candidate field 417 is a field for displaying the identifiers of the candidate maintenance centers 110.

The transmission destination panel 418 is a panel for displaying the transmission destination designated by the engineer and when the engineer presses the candidate of the maintenance center candidate list 415 using the mouse, the identifier of the pressed maintenance center 110 is displayed in connection with it.

Further, the service person may directly input the identifier of a different maintenance center 110 from the displayed candidate to the transmission destination panel 418.

As mentioned above, in the system of this embodiment, one or more semiconductor manufacturing devices 123 and one or more operation devices 113 are connected via Internet 100, and the semiconductor manufacturing devices 123 monitor an occurrence of a trouble in the semiconductor devices 123, and when a device 123 detects an occurrence of a trouble, the device 123 generates a status for identifying the condition of the trouble, decides the operation device 113 to be notified of the status, and notifies the decided operation device 113 of the status, and the operation device 113 decides the troubleshooting for the trouble of the semiconductor device 123 on the basis of the notified status and transmits the maintenance operation based on the troubleshooting to the semiconductor manufacturing device 123, and the semiconductor manufacturing device 123 executes the process according to the received maintenance operation, generates charge information concerning maintenance according to the identifier of the operation device which is notified of the status information, and outputs the generated charge information on the screen of the semiconductor manufacturing device 123, so that thorough billing can be executed according the maintenance request destination. Further, when the semiconductor manufacturing device 123 detects an occurrence of a trouble, the device 123 generates candidate information indicating one or more candidates of the operation device 113 to be notified of the status, outputs the generated candidate information, and notifies the status to the operation device 113 designated by the user of the semiconductor manufacturing device 123 from the output candidates, so that the maintenance request destination can be easily designated. Further, the semiconductor manufacturing device 123 notifies the status also to a different maintenance center 110 from the candidates designated and displayed by the engineer, so that the maintenance request destination can be flexibly designated.

As mentioned above, according to the present invention, control and though services and billing according to the contents of the maintenance operation executed by the semiconductor manufacturing device and the maintenance request destination can be executed.

Further, access limit according to the attribute of a service person, access limit according to the state of the device, and output limit according to the output mode can be executed.

What we claim is:

1. A remote maintenance method for a system that an industrial device for executing a specific process and an operation device for maintaining said industrial device are connected to each other via a network, characterized in that said operation device transmits command information indicating a maintenance command to said industrial device and said industrial device executes said process according to said received command information, holds mode information for identifying a state for outputting a state of a maintenance operation to said industrial device and condition information indicating a condition concerning said state necessary to output said state of said maintenance operation, reads said mode information and said condition information when said industrial device receives said command information from said operation device, and outputs said state of said maintenance operation to an output device of said industrial device only when said state in said mode information satisfies said condition in said condition information.

2. A remote maintenance method according to claim 1, wherein said industrial device is a semiconductor manufacturing device.

3. A remote maintenance method for a system that an industrial device for executing a specific process and an operation device for maintaining said industrial device are connected to each other via a network, characterized in that said operation device transmits command information indicating a maintenance command and condition information indicating a condition concerning a state necessary to output a state of a maintenance operation to said industrial device and said industrial device executes said process according to said received command information, holds mode information for identifying a state for outputting said state of said maintenance operation to said industrial device and said condition information, reads said mode information and said condition information when said industrial device receives said command information from said operation device, and outputs said state of said maintenance operation to an output device of said industrial device only when said state identified by said mode information satisfies said condition in said condition information.

4. A remote maintenance method according to claim 3, wherein said industrial device is a semiconductor manufacturing device.

5. An industrial device for receiving a maintenance operation from an operation device connected via a network by remote control, comprising communication means for receiving command information indicating a command of maintenance from said operation device, processing means for executing a process according to said command information received by said communication means, and output means for holding mode information for identifying a state for outputting a state of said maintenance operation and condition information indicating a condition concerning said state necessary to output said state of said maintenance operation, reading said mode information and said condition information when said processing means executes said process, and outputting said state of said maintenance operation to an output device of said industrial device only when said state of said mode information satisfies said condition of said condition information.

6. An industrial device according to claim 5, wherein said industrial device is a semiconductor manufacturing device.

7. An industrial device for receiving a maintenance operation from an operation device connected via a network by remote control, comprising communication means for receiving command information indicating a command of maintenance from said operation device, processing means for executing a process according to said command information received by said communication means, and output means for holding mode information for identifying a state for outputting a state of said maintenance operation and condition information indicating a condition concerning said state necessary to output said state of said maintenance operation, reading said mode information and said condition information when said processing means executes said process, and outputting said state of said maintenance operation to an output device of said industrial device only when said state of said mode information satisfies said condition of said condition information, wherein said communication means receives said condition information from said operation device and said output means holds said condition information received by said communication means, reads said mode information and said received condition information when said processing means executes said process, and outputs said state of said maintenance operation to an output device of said industrial device only when said state in said mode information satisfies said condition in said condition information.

8. An industrial device according to claim 7, wherein said industrial device is a semiconductor manufacturing device.

* * * * *